(12) United States Patent
Rothwell et al.

(10) Patent No.: US 10,697,822 B2
(45) Date of Patent: Jun. 30, 2020

(54) DEVICES, METHODS AND COMPUTER PROGRAM PRODUCTS PROVIDING MULTI-AXIS VIBRATIONAL MEASUREMENT WITH PREDICTIVE ANALYSIS

(71) Applicant: ProAxion, Inc., Apex, NC (US)

(72) Inventors: Justin Robert Rothwell, Apex, NC (US); Elliot Jacob Poger, Raleigh, NC (US)

(73) Assignee: PROAXION, INC., Apex, NC (US)

( * ) Notice: Subject to any disclaimer, the term of this patent is extended or adjusted under 35 U.S.C. 154(b) by 329 days.

(21) Appl. No.: 15/876,573

(22) Filed: Jan. 22, 2018

(65) Prior Publication Data

US 2018/0216990 A1 Aug. 2, 2018

Related U.S. Application Data

(60) Provisional application No. 62/452,676, filed on Jan. 31, 2017.

(51) Int. Cl.
| | |
|---|---|
| *G01H 1/12* | (2006.01) |
| *G01K 1/02* | (2006.01) |
| *G05B 19/404* | (2006.01) |
| *G01H 1/00* | (2006.01) |
| *H04W 4/02* | (2018.01) |
| *H04W 4/38* | (2018.01) |

(52) U.S. Cl.
CPC .......... *G01H 1/12* (2013.01); *G01H 1/00* (2013.01); *G01K 1/022* (2013.01); *G01K 1/024* (2013.01); *G01K 1/026* (2013.01); *G05B 19/404* (2013.01); *H04W 4/027* (2013.01); *G01K 2215/00* (2013.01); *H04W 4/02* (2013.01); *H04W 4/38* (2018.02)

(58) Field of Classification Search
None
See application file for complete search history.

(56) References Cited

U.S. PATENT DOCUMENTS 7,292,947 B1 * 11/2007 Tabatabaei ............ G01R 29/26
702/191
9,927,285 B2 * 3/2018 Piety .................... G01H 1/00

* cited by examiner

*Primary Examiner* — Roy Y Yi
(74) *Attorney, Agent, or Firm* — Myers Bigel, P.A.

(57) ABSTRACT

A sensor may include a housing configured to couple to a machine; at least one processor within the housing; a battery within the housing; a communication adapter within the housing and coupled to the at least one processor; and a measurement device within the housing and coupled to the at least one processor and the battery. The communication adapter may be configured to wirelessly connect to a communication network. The measurement device may be configured to: obtain measurements of a physical characteristic of the machine to which the housing is coupled and transmit the measurements via the communication adapter, and automatically switch between a first measurement mode comprising a first sampling rate and a second measurement mode comprising a second sampling rate, different from the first sampling rate, without human intervention.

19 Claims, 11 Drawing Sheets

DEVICES, METHODS AND COMPUTER PROGRAM PRODUCTS PROVIDING MULTI-AXIS VIBRATIONAL MEASUREMENT WITH PREDICTIVE ANALYSIS

CROSS-REFERENCE TO RELATED APPLICATION

This non-provisional patent application claims priority to U.S. provisional patent application 62/452,676, filed Jan. 31, 2017, the disclosure of which is incorporated herein in its entirety by reference.

FIELD OF INVENTION

The present inventive concepts relate to measurement of operating machinery, and, more specifically, to dynamically measuring multi-axis vibration and/or other parameters and predictive analysis based thereon.

BACKGROUND

Modern manufacturing and industrial environments utilize a diverse set of machinery requiring regular maintenance and oversight. For example, motors and/or power transmission equipment used in manufacturing environments may operate continuously for several hours every day.

Diagnosing issues with industrial machinery can be expensive and can require extensive knowledge. For example, in some environments maintenance is performed by trained personnel using expensive measuring equipment. The measuring equipment may be highly precise and complex. As a result, the personnel operating such measuring equipment may require extensive training, both in using such measuring equipment and in interpreting the results. For example, the personnel must often know the exact place to place probes for the measuring equipment, which may depend on the type of machinery being monitored. Similarly, interpreting the results may require knowledge of exactly what types of measurements are expected for that type of machinery, running at that speed, and what types of anomalies might be present based on the types of measurements that are collected.

One type of measuring equipment measures vibrations of the machinery. While vibrations are expected during the operation of machinery, measuring equipment can detect, by a person with the proper training, that the vibrations are anomalous from vibrations that are expected. For example, the vibrations may be more pronounced, more erratic, at a different frequency, etc. By reading the vibrations or characteristics in different directions and/or at different locations under specific conditions, trained personnel can detect that the condition of the machinery has changed, which may require increased monitoring and/or scheduled repair.

SUMMARY

Some embodiments of the present inventive concepts are directed to devices, methods, and computer program products for providing multi-axis vibrational measurement using interconnected networks and predictive analysis techniques.

According to some embodiments of the present inventive concepts, a sensor may include a housing configured to couple to a machine; at least one processor within the housing; a battery within the housing; a communication adapter within the housing and coupled to the at least one processor, wherein the communication adapter is configured to wirelessly connect to a communication network; and a measurement device within the housing and coupled to the at least one processor and the battery, wherein the measurement device is configured to: obtain measurements of a physical characteristic of the machine to which the housing is coupled and transmit the measurements via the communication adapter, and automatically switch between a first measurement mode comprising a first sampling rate and a second measurement mode comprising a second sampling rate, different from the first sampling rate, without human intervention.

In some embodiments, the sensor may further include a storage device within the housing and coupled to the at least one processor and configured to store the measurements of the physical characteristic that are obtained by the measurement device.

In some embodiments, the first measurement mode may utilize less storage from the storage device than the second measurement mode.

In some embodiments, the first measurement mode consumes less power from the battery than the second measurement mode.

In some embodiments, the measurement device may be further configured to switch between the first measurement mode and the second measurement mode responsive to a detected change in the physical characteristic of the machine.

In some embodiments, the measurement device may be further configured to switch from the first measurement mode to the second measurement mode responsive to the detected change in the physical characteristic exceeding a predetermined threshold, wherein the second sampling rate of the second measurement mode is higher than the first sampling rate of the first measurement mode.

In some embodiments, wherein the measurement device may be further configured to: switch from the first measurement mode to the second measurement mode responsive to an elapse of a predetermined time duration, and switch from the first measurement mode to the second measurement mode prior to the elapse of the predetermined time duration responsive to the detected change in the physical characteristic exceeding the predetermined threshold.

In some embodiments, the measurement device may be further configured to switch between the first measurement mode and the second measurement mode responsive to a communication received by the communication adapter.

In some embodiments, the communication adapter may be configured to releasably couple to the machine.

In some embodiments, the sensor may further include a first set of computer instructions comprising a first firmware level at a first storage location within the housing; and a second set of computer instructions comprising a second firmware level, different from the first set of computer instructions, at a second storage location, different from the first storage location, within the housing, wherein the at least one processor is configured to transmit a network communication via the communication adapter and to switch from the first set of computer instructions to the second set of computer instructions responsive to an absence of a response to the network communication within a predetermined time interval.

In some embodiments, the first set of computer instructions may include a first version of an operating system, the second set of computer instructions comprises a second version of the operating system, and the at least one processor may be configured to switch from the first set of computer instructions to the second set of computer instructions by rebooting from the first version of the operating system to the second version of the operating system.

In some embodiments, the physical characteristic of the machine is vibration and/or temperature.

According to some embodiments of the present inventive concepts, a networking gateway may include at least one processor; and a communication adapter coupled to the at least one processor and configured to wirelessly connect to a communication network. The at least one processor may be configured to perform operations including: transmitting configuration information to a remote measurement device wirelessly via the communication adapter, the configuration information configured to switch the remote measurement device between a first measurement mode comprising a first sampling rate of the remote measurement device and a second measurement mode comprising a second sampling rate of the remote measurement device, different from the first sampling rate, and receiving measurement data of a physical characteristic of a machine from the remote measurement device wirelessly via the communication adapter.

In some embodiments, the operations may further include: analyzing the measurement data received from the remote measurement device, detecting a change in the measurement data that exceeds a predetermined threshold, and transmitting the configuration information to switch the remote measurement device between the first measurement mode and the second measurement mode responsive to the detected change in the measurement data.

In some embodiments, the second sampling rate of the second measurement mode may be higher than the first sampling rate of the first measurement mode.

In some embodiments, receiving the measurement data from the remote measurement device wirelessly via the communication adapter may include receiving the measurement data at a time interval that is independent of a rate at which the remote measurement device samples the measurement data.

In some embodiments, the operations may further include: receiving a clock communication from the remote measurement device comprising a clock time of the remote measurement device; and calculating a clock offset of the clock time of the remote measurement device from a common reference clock.

In some embodiments, the measurement data may include a timestamp, and the operations may further include adjusting the timestamp of the measurement data based on the clock offset.

In some embodiments, the remote measurement device may be a first remote measurement device, the measurement data may be first measurement data, the clock communication may be a first clock communication, the clock time may be a first clock time, the timestamp may be a first timestamp, and the clock offset may be a first clock offset, and the operations may further include receiving a second clock communication from a second remote measurement device comprising a second clock time of the second remote measurement device, wherein the second remote measurement device is different from the first remote measurement device, calculating a second clock offset of the second clock time of the second remote measurement device from the common reference clock, wherein the second clock offset is different from the first clock offset, receiving second measurement data from the second remote measurement device wirelessly via the communication adapter, and adjusting a second timestamp of the second measurement data based on the second clock offset.

In some embodiments, the configuration information may include a sampling schedule configured to schedule a measurement of the remote measurement device at a designated time.

In some embodiments, the sampling schedule may be based on the clock offset.

In some embodiments, the remote measurement device may be a first remote measurement device, the configuration information may be first configuration information, the measurement data may be first measurement data, the clock communication may be a first clock communication, the clock time may be a first clock time, the clock offset may be a first clock offset, and the sampling schedule may be a first sampling schedule, and the operations may further include: receiving a second clock communication from a second remote measurement device comprising a second clock time of the second remote measurement device, wherein the second remote measurement device is different from the first remote measurement device; calculating a second clock offset of the second clock time of the second remote measurement device from the common reference clock, wherein the second clock offset is different from the first clock offset; and transmitting second configuration information to the second remote measurement device wirelessly via the communication adapter, the second configuration information comprising a second sampling schedule, different from the first sampling schedule, that is configured to schedule a measurement of the second remote measurement device at the designated time.

In some embodiments, the first sampling schedule and the second sampling schedule may be configured to be within less than one second from one another.

In some embodiments, the operations may further include scheduling the measurement of the first remote measuring device and the second remote measurement device at the designated time responsive to determining that the first remote measurement device and the second remote measurement device are located on a same machine.

According to some embodiments of the present inventive concepts, a computer program product may include a tangible non-transitory computer readable storage medium comprising computer readable program code embodied in the medium that when executed by at least one processor causes the at least one processor to perform operations. The operations may include: wirelessly transmitting configuration information to a remote measurement device, the configuration information configured to switch the remote measurement device between a first measurement mode comprising a first sampling rate of the remote measurement device and a second measurement mode of the remote measurement device comprising a second sampling rate, different from the first sampling rate, and receiving measurement data from the remote measurement device of a physical characteristic of a machine at a time interval that is independent of a rate at which the remote measurement device samples the measurement data.

In some embodiments, the operations may further include analyzing the measurement data received from the remote measurement device; detecting a change in the measurement data that exceeds a predetermined threshold; and transmitting the configuration information to switch the remote measurement device between the first measurement mode and the second measurement mode responsive to the detected change in the measurement data.

In some embodiments, the second sampling rate of the second measurement mode may be higher than the first sampling rate of the first measurement mode.

In some embodiments, the operations may further include receiving a clock communication from the remote measurement device comprising a clock time of the remote measurement device; and calculating a clock offset of the clock time of the remote measurement device from a common reference clock.

In some embodiments, the measurement data may include a timestamp, and the operations may further include adjusting the timestamp of the measurement data based on the clock offset.

In some embodiments, the configuration information may include a sampling schedule configured to schedule a measurement of the remote measurement device at a designated time.

In some embodiments, the sampling schedule may be based on the clock offset.

In some embodiments, the remote measurement device may be a first remote measurement device, the configuration information may be first configuration information, the measurement data may be first measurement data, the clock communication may be a first clock communication, the clock time may be a first clock time, the clock offset may be a first clock offset, and the sampling schedule may be a first sampling schedule. The operations may further include receiving a second clock communication from a second remote measurement device comprising a second clock time of the second remote measurement device, wherein the second remote measurement device is different from the first remote measurement device; calculating a second clock offset of the second clock time of the second remote measurement device from the common reference clock, wherein the second clock offset is different from the first clock offset; and transmitting second configuration information to the second remote measurement device, the second configuration information comprising a second sampling schedule, different from the first sampling schedule, that is configured to schedule a measurement of the second remote measurement device at the designated time.

In some embodiments, the first sampling schedule and the second sampling schedule may be configured to be within less than one second from one another.

In some embodiments, the operations may further include scheduling the measurement of the first remote measuring device and the second remote measurement device at the designated time responsive to determining that the first remote measurement device and the second remote measurement device are located on a same machine.

In some embodiments, the operations may further include receiving an image from a user depicting a machine to which the remote measurement device is to be attached; analyzing the image to determine a location for attachment of the remote measurement device; and communicating the determined location to the user.

BRIEF DESCRIPTION OF THE DRAWINGS

The accompanying figures are included to provide a further understanding of the present inventive concepts, and are incorporated in and constitute a part of this specification. The drawings illustrate some embodiments of the present inventive concepts and, together with the description, serve to explain principles of the present inventive concepts. Like numbers refer to like elements throughout.

DETAILED DESCRIPTION

Figure 1:
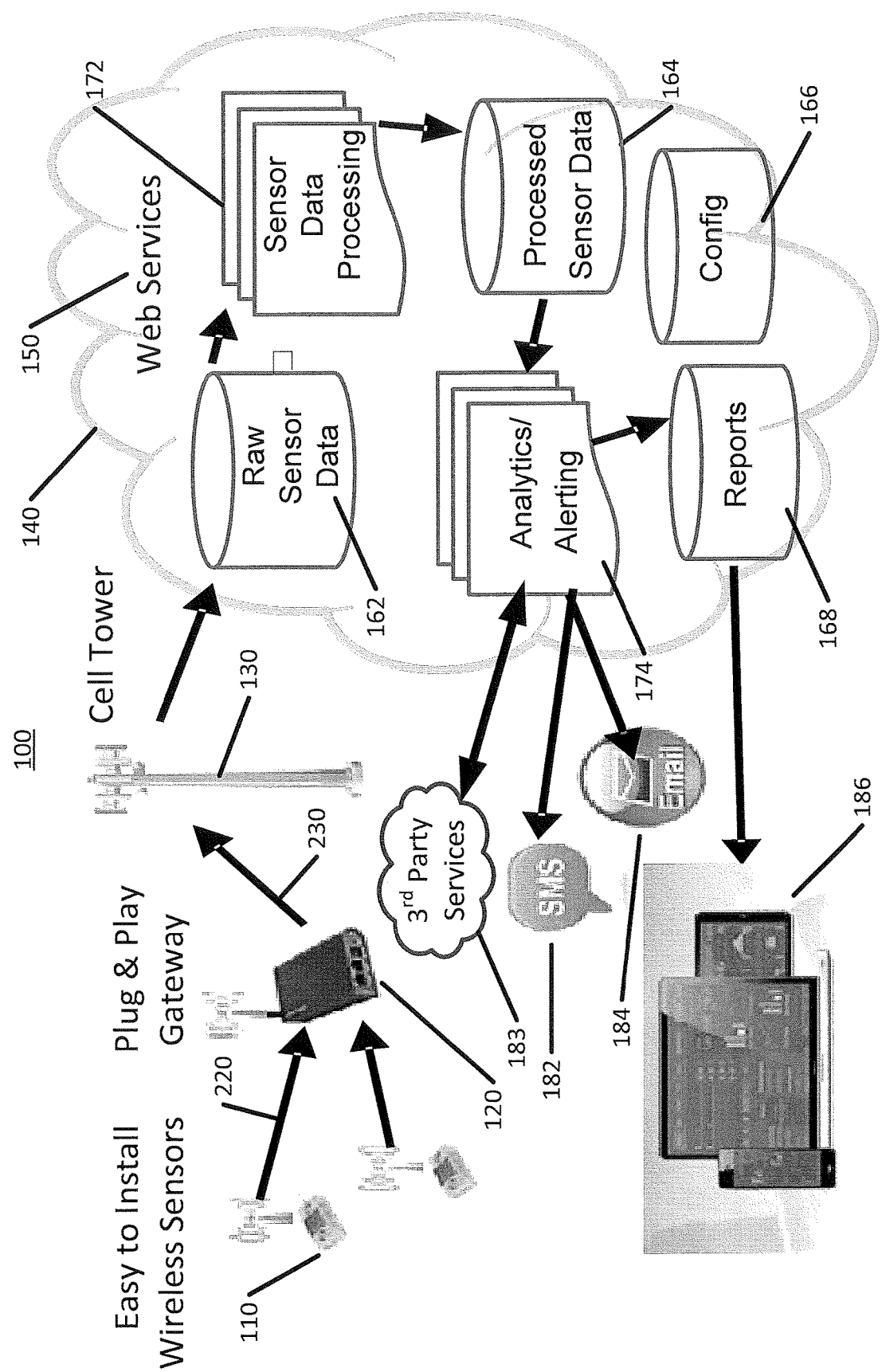
FIG. 1 illustrates a monitoring system according to embodiments of the present inventive concepts.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the present inventive concepts to those skilled in the art. Like reference numerals refer to like elements throughout the specification.

The measurement of vibration and/or other physical characteristics, such as temperature, of motors and/or machinery involved in operations such as manufacturing can be useful in preventing maintenance. Maintenance issues with such machinery are expensive not only because of the costly repairs involved, but also because of the downtime associated with such repairs. As a result, it is often beneficial to monitor such machinery to preemptively diagnose and address maintenance issues. By preemptively addressing maintenance issues, repairs to the machinery may be cost effective, and may also be scheduled at a time that is more convenient such that downtime can be minimized and/or avoided.

As illustrated herein, embodiments of the present inventive concepts may provide a flexible, dynamic approach to the placement and communication with measuring equipment for machinery, as well as to the analysis and subsequent alerting of potential problems that may be uncovered by such measuring equipment. Embodiments of the present inventive concepts may also provide a cloud-based approach to the analysis of data from measuring equipment used to monitor machinery that may automate the diagnosis and predictive identification of issues with the monitored machinery.

FIG. 1 illustrates a monitoring system 100 according to embodiments of the present inventive concepts. The monitoring system 100 may allow for data collected at sensors 110 to be communicated to a set of web services 150 in a cloud network 140 that process the data for predictive analysis. As illustrated in FIG. 1, the monitoring system may include sensors 110 and gateways 120. The sensors 110 and gateways 120 may be configured to be installed at a location in which the monitoring of the machinery is to take place. For example, the sensors 110 and the gateways 120 may be installed within a factory. The sensors 110 may be placed on the machinery itself, and may communicate data from the sensors 110 to the gateways 120.

The sensors 110 may be releasably or fixedly coupled to one or more portions of one or more pieces of machinery. In other words, the sensors 110 may be attached, and subsequently monitor, multiple pieces of machinery within a particular location. In addition, more than one sensor 110 may be attached to a particular piece of machinery. It will be understood that the term "releasably coupled" includes any type of action that allows the sensor 110 to be coupled to (and decoupled from) the one or more portions of one or more pieces of machinery, by an installer, without the need for specialized tools and/or procedures in keeping the accepted practices and regulations. For example, it will be understood that the term "releasably coupled" includes actions (including the opposing actions) such as magnetically attaching, sliding, latching, screwing, twisting, pushing, and clamping. For example, in some embodiments, the attachment may be magnetic, via fasteners, and/or via an adhesive, though the present inventive concepts are not limited thereto. In some embodiments, the sensors 110 may be attached via fasteners such as screws, rivets, ties, and the like. In some embodiments, the sensors 110 may be attached via an adhesive such as an epoxy. The sensors 110 may be attached to points at which vibration and/or temperature may be measured.

A sensor 110 may be configured to record data from the machinery to which they are attached. For example, the sensor 110 may be configured to record data associated with vibration and/or temperature. In some embodiments, a sensor 110 may be configured to record vibration as seen in multiple axes. For example, the sensor 110 may contain an accelerometer and/or other measurement device configured to measure vibration in three axes. The sensor 110 may be configured to capture multiple data points per second. For example, the sensor may capture between 100 and 20,000 measurements per second, though the inventive concepts are not limited thereto. In some embodiments, the sampling frequency of the measurement device can be changed dynamically. The sensor 110 may store the vibration measurement data locally for communication to other devices, as described further herein.

The sensor 110 may also be configured to measure temperature. The measured temperature may be taken of the ambient temperature of the sensor 110 and/or the temperature of the machinery to which the sensor 110 is attached. For example, the sensor 110 may be attached to the machinery via a magnetic base and a temperature conducted through the magnetic base may be measured. In some embodiments, the sensor 110 may utilize probes connected to the machinery to measure temperature, such as, for example, temperature transducers, thermistors, thermocouples, and the like. The probes may communicate with the sensor 110 over either a wireless and/or wired connection. The sensor 110 may store the temperature measurement data locally for communication to other devices, as described further herein.

Though vibration and temperature measurement are discussed herein, it will be understood that other types of measurement are possible without deviating from the present inventive concepts. The sensor 110 may collect and store data from multiple types of measurement devices such as, for example, speed, pressure, flow, current draw, etc. It will be understood that a given facility may employ a plurality of sensors 110 and that different ones of the sensors 110 may utilize different types of measurement devices.

In some embodiments, the sensor 110 may have one or more power states that affect its ability to record data and/or measurements. For example, the sensor 110 may have a "normal" mode and a "low power" mode. The "low power" mode may differ from the "normal" mode in that the sensor 110, when operating in the "low power" mode, may have a diminished ability to measure detailed changes in, for example, vibration or temperature, but may be able to detect gross changes thereof (e.g., changes that exceed a predetermined threshold). For example, in "low power" mode, the sensor 110 may have a reduced frequency of sampling of one or more of the measurement devices of the sensor 110. For example, if a measurement device is an accelerometer, the sensor 110 may have a reduced ability to detect high-frequency vibrations (such as those which might indicate bearing failure) in "low power" mode, but low-frequency vibrations (such as those associated with equipment being started or stopped) would still be detectable in "low power" mode. In some embodiments, by switching to the "low power" mode, the sensor may be able to conserve power. Upon detecting a gross change in the environment, the sensor 110 may convert to the "normal" mode to capture more detailed data. For example, in some embodiments, a sensor 110 may be configured to sleep (i.e., reduce operations to a bare minimum) for a given duration (e.g., 5-10 minutes) and then wake up (i.e., resume normal operations) to record measurement data. In some embodiments, the sleep state of the sensor 110 may correspond to the "low power" mode, and the sensor 110 may perform reduced measurements during the sleep interval. In some embodiments, the sensor 110 may be programmed to exit the sleep state early (i.e., prior to the expiry of its sleep duration) on detecting a gross change in the environment, such as a vibration and/or temperature measurement that exceeds a given threshold. In this way, the sensor 110 can reduce and/or minimize the use of power while maintaining an ability to quickly respond to environmental changes.

In some embodiments, the sensor 110 may be able to dynamically adjust a sampling mode of its measurements (e.g., the sampling rate of an accelerometer). For example, one mode of the measurements may include a higher frequency resolution (e.g., higher sampling rate) that stores larger amounts of data. A second mode of the measurements may include a lower sampling rate that is more compatible with longer-term data collection. Both the higher frequency measurement mode and the lower frequency measurement mode may operate with non-zero sampling rates (e.g., in both measurement modes, the sensor 110 is actively measuring, but with differing, non-zero, sampling rates). In some embodiments, the sensor 110 may have a finite internal storage. When longer term measurement is desired, the sensor 110 may switch to a lower sampling resolution so as to use less of the internal storage. In some embodiments, the sensor 110 may configure the mode of measurement based on a received configuration. In some embodiments, the sensor 110 may configure the mode of measurement unilaterally based on its analysis of its available internal storage and the operating environment. For example, the sensor 110 may be configured to detect particular "triggers" in the recorded data, and may respond by altering its sampling rate or other mode of measurement. In some embodiments, the sensor 110 may be capable of switching dynamically between different modes of measurement without otherwise interrupting the measurement.

The sensors 110 may be configured to communicate data that is measured by the measurement devices to a gateway 120. The communication between respective ones of the sensors 110 and the gateway 120 may take place over a communication network 220. The communication network 220 may include, for example, WiFi (e.g., IEEE 802.11 and variants thereof), USB, IEEE 1394, Bluetooth, Bluetooth Low-Energy, a power line network (PLN), electrical wiring, and/or various forms of radio, though the present inventive concepts are not limited thereto. In some embodiments, the communication network 220 may represent multiple networks using different protocols, and may be connected so as to allow for redundant networks of communication.

In some embodiments, a sensor 110 may be configured to automatically pair to a gateway 120 over the communication network 220. For example, the sensor 110 may be configured to utilize Bluetooth Low Energy to automatically pair, and exchange data with, a gateway 120. In some embodiments, the sensor 110 may be configured separately to communicate with a gateway 120, such as by configuring a wireless network address.

The sensor 110 may be configured both to transmit data, such as measurement data, to the gateway 120 as well as receive data. For example, the sensor may receive configuration information from the gateway 120. In some embodiments, the sensor 110 may receive a sampling frequency for the measurement devices of the sensor 110 from the gateway 120. That is to say that the gateway 120 may instruct the sensor 110 how frequently to measure for each of the measurement devices of the sensor. In some embodiments, the gateway 120 may also provide operating code, such as firmware, to the sensor 110.

The sensor 110 may be configured to periodically connect to the gateway 120 to transfer measurement data that has been collected. In other words, the sensor 110 may, in some embodiments, store measurement data for a period of time and then communicate multiple samples of the measurement data to the gateway 120 in a batch. The individual samples of measurement data may include timestamps such that data can be matched to a particular measurement interval regardless of when it is transmitted. In some embodiments, the sensor 110 may transmit measurement data to the gateway 120 immediately without storing the measurement data.

The gateway 120 may be able to schedule how the frequently the sensor 110 communicates data to the gateway 120. Because the gateway 120 may communicate with multiple sensors 110, the gateway 120 may be configured to schedule the multiple sensors 110 so that different sensors 110 are reporting measurement data at different intervals. The reporting of measurement data at different intervals may be performed even though the multiple sensors 110 are sampling at a similar sampling rate. In this way, the gateway 120 can avoid congestion in measurement data reporting amongst the various sensors 110.

The gateway 120 may be further connected to a cloud network 140. As illustrated in FIG. 1, the gateway 120 may be connected to the cloud network 140 via a radio telecommunication network 230 such as a radio network used for cellular/mobile phones. The gateway 120 may be connected to the cloud network 140 via, for example, a cellular tower 130, or other component of the radio telecommunication network 230. Though illustrated in FIG. 1 as a radio network, it will be understood that other networks are possible. For example, the gateway 120 may be connected to the cloud network 140 via a wired and/or wireless connection, such as an Ethernet network.

The cloud network 140 may be computer network, including any conventional, public and/or private, real and/or virtual, wired and/or wireless network, including the Internet. The cloud network 140 may include one or more computer servers that are capable of being accessed over the cloud network 140 by the gateway 120. The computer servers may provide web services 150. It will be understood that the web services 150 may be executed on one or more computer servers. In addition, the web services 150 may be executed on virtual computer servers configured within the cloud network 140. The virtual computer servers may provide a virtual computing environment that, itself, executes on one or more physical computer servers.

The gateway 120 may provide the measurement data received from the sensors 110 to the web services 150. The web services 150 may provide processing and/or storage for the measurement data.

For example, the web services 150 may receive and store the raw sensor data 162. The web services 150 may receive the raw sensor data 162 from multiple sensors 110 and/or multiple gateways 120. The web services may receive the raw sensor data 162 from multiple customers and/or multiple locations. The web services may correlate, within the storage of the raw sensor data 162 which measurement data is associated with which customer, which location, and/or which piece of equipment. For example, the raw sensor data 162 may include references for each piece of raw sensor data 162 is associated with a particular user. In some embodiments, the raw sensor data 162 may include references for which pieces of measurement data are associated with sensors 110 that are located on a same piece of machinery.

The web services 150 may include sensor data processing 172 which is configured to process the raw sensor data 162. The sensor data processing 172 may analyze the raw sensor data 162 to determine patterns in the data. In some embodiments, the sensor data processing 172 may perform spatial analysis of the vibration data that is received. For example, the sensor data processing 172 may determine a relative magnitude of a vibration in a particular axis of measurement, such as an x-, y-, and/or z-axis, and/or combinations of these axes. In some embodiments, the sensor data processing 172 may perform frequency analysis of the vibration data that is received. For example, the sensor data processing 172 may determine a relative magnitude of a vibration at particular frequencies, such as 10 Hz and/or 12 Hz. In some embodiments, the sensor data processing 172 may do a spectral analysis of the data that is received. For example, the sensor data processing 172 may determine an overall vibration at all measured frequencies and/or across all measured dimensions. In some embodiments, the sensor data processing 172 may include analysis based on associations between data received from different sensors 110. For example, the sensor data processing 172 may include analysis based on sensor data received from two sensors 110 that are located on the same piece of machinery. The sensor data processing 172 may include machine learning, neural networks, and/or artificial intelligence techniques as part of the sensor data processing 172.

The sensor data processing 172 may generate additional processed sensor data 164. The processed sensor data 164 may include data indicating trends in the raw sensor data 162 over time, as well as other data related to the analysis performed during the sensor data processing 172. For example, the processed sensor data 164 may include a frequency analysis of the raw sensor data 162.

The web services 150 may also provide analytics 174 based on the processed sensor data 164. The analytics may examine the processed sensor data to determine if additional actions need to be taken responsive to the raw sensor data 162. The analytics 174 may analyze, for example, the generated frequency analysis, spectral analysis, etc. to determine whether an area of concern has been indicated within the raw sensor data 162. For example, the analytics 174 may detect that a particular measured vibration from the machinery being monitored by the sensor 110 is anomalous.

The analytics 174 may include additional data related to the machinery, such as customer configuration data 166. The customer configuration data 166 may indicate the types of machinery present at the customer site at which the sensor 110 is located. In some embodiments, the customer configuration data 166 may include the type of machinery, and/or location on the machinery, to which the sensor 110 is attached. The analytics 174 may use this additional information to further determine if additional action is necessary. For example, the analytics 174 may determine that a particular piece of processed sensor data 164 is not anomalous based on a determined location of where the sensor 110 that recorded the data is located. The analytics 174 may determine that a same level of vibrational data from another sensor 110 located at a different location is anomalous because it may be located at a more critical location on a piece of machinery.

Based on the results of the analytics 174, multiple actions may be taken. For example, in some embodiments, reports 168 may be generated. The reports 168 may indicate the data that was analyzed, what determinations were made from the data, and what action, if any, was taken. The reports 168 may be categorized by user so that a given user of the analytics 174 sees data that is associated with sensors 110 of that particular user. The reports 168 may be accessible directly by the user, such as via a network communication utilizing a web browser 186. The web browser 186 may be capable of running on a computer such a computer server, a laptop, a mobile device, etc.

In some embodiments, the analytics 174 may generate alerts to the user. For example, the analytics 174 may generate a text message 182 and/or an email 184, but the present inventive concepts are not limited thereto. In some embodiments, the analytics 174 may generate other types of messaging such as, for example, an automated phone call. The alerts may be used to warn the user of impending issues with machinery of the user that have been measured by the sensors 110 and detected by the web services 150. The alert may indicate which sensor 110 is anomalous and may direct the user to connect to the web services 150 to learn more. The user may then connect to the web services 150, such as through a web browser 186, to view the alert, the associated data, and/or other pertinent information. In some embodiments, the analytics 174 may generate audio and/or visual indicators that are detectable at the machinery being monitored itself such as, for example, indicator lights, sounds, and/or vibrations.

In some embodiments, the analytics 174 may interact with other systems outside of the monitoring system 100 to perform tasks associated with the monitoring system 100. For example, the analytics 174 may access third-party services 183 provided by external providers. In some embodiments, the analytics 174 may access an Application Programming Interface (API) to cloud-based software applications. Examples of cloud-based software applications include, but are not limited to, web-based maintenance management software, repair and/or parts services applications, and/or data analytics providers. In some embodiments, the analytics 174 may access third-party services 183 to receive alerts for when a particular machine that is being monitored may need service and/or may need parts for replacement. For example, the analytics 174 may access an equipment provider to determine that the machinery contains equipment that has exceeded a particular number of operating hours and, as a result, a replacement of that equipment would be beneficial. In response, an alert may be generated to indicate the replacement recommendation. In some embodiments, the analytics 174 may combine measurement data of the sensors 110 with other data received from the third-party services 183 to determine that an alert is required. For example, the analytics 174 may combine received measurement data indicating increased vibration of monitored machinery with information on parts provided by a third-party parts service application to generate an alert recommending replacement of a particular part of the machinery.

The alerts may be in different categories. For example, the alerts may include a category for relative importance, such as low, medium high. The alert may also be categorized based on the type of action to be taken, e.g. schedule maintenance, repair, and/or monitoring.

The analytics 174 may determine a recipient for the alert by accessing the customer configuration 166. The customer configuration 166 may indicate a preferred contact method for alerts, contact information for using the alert (e.g., email address, text number, etc.), and a preference for which types of events should receive an alert. For example, a customer may indicate that they only wish to receive a text alert for high importance alerts, and that email should be used for alerts of other categories. In some embodiments, a customer may indicate that different personnel should be alerted depending on the day or time at which the alert occurs.

The analytics 174 may be implemented by processing instructions, such as code, executing on processors of computer servers associated with the web services 150. In some embodiments, the analytics 174 may utilize machine learning, neural networks, and/or other types of artificial intelligence.

In addition to providing alerts, the web services 150 may provide configuration information back to the sensors 110 as a result of the analytics 174. The configuration information may be provided automatically without human intervention. For example, the analytics 174 may determine that a particular sensor 110 is providing measurement data that is not yet an issue, but may become an issue in the future. Responsive to that determination, the web services 150 may provide configuration data back to the sensor 110 to configure the sensor 110 to collect measurement data more frequently. The determination and the providing of the configuration data to the sensor 110 may be performed automatically without human intervention. By automatically adjusting the configuration of the sensors 110, the web services 150 may allow for more accurate reporting and rapid adjustment to determined changes in the operating environment of the machinery. Such reporting may allow for more accurate detection of potential problems and an overall increase in the usable life of the machinery.

The gateway 120 may receive the configuration data from the web services 150 and further provide the configuration data to the sensor 110. As another example, the analytics 174 may determine that a particular sensor 110 no longer needs to measure data as frequently as previously indicated. The web services 150 may responsively provide configuration data to the sensor 110 indicating that the sensor should collect measurement data less frequently.

For example, the configuration data provided to the sensor 110 may include configuration options to move the sensor 110 between a "low power" mode and a "normal" mode, as discussed herein. For example, the web services 150 may determine, as a result of the analytics 174, that the sensor 110 should move to a "low power" mode responsive to determining that the operating environment has not changed significantly over a predetermined interval. As discussed herein, while in "low power" mode, the sensor 110 may be capable of detecting gross changes in the operating environment, but may not be able to detect more detailed changes. Upon receiving information from a sensor 110 in "low power" mode that a gross change to the environment has been detected, the web services 150 may provide configuration data to the sensor 110 to switch to "normal" mode. In some embodiments, the sensor 110 may make this switch automatically without intervention from the web services 150. In some embodiments, the web services 150 may provide configuration data to the sensor 110 to move between a higher frequency resolution (e.g., a higher sampling rate) with a larger amount of data and a lower frequency resolution (e.g., a lower sampling rate) with a smaller amount of data.

In addition to providing services related to measurement data, the web services 150 may also be configured to provide information related to the placement of the sensors 110 to the user. In order to obtain beneficial equipment monitoring, vibration sensors 110 may be placed on particular locations on the monitored equipment. Also, there are different methods of affixing the sensors 110 to the equipment that may be appropriate in different circumstances (e.g., magnetic, stud mounting, adhesive attachment, etc.).

Conventionally, installation of vibration monitoring equipment utilizes the services of trained personnel to recommend location and method of attachment of the equipment. In contrast, web services 150 may provide a list of industrial equipment models for the user to choose from (e.g., indexed by manufacturer name and model number). Once the user has indicated which model of equipment is being monitored, the web services 150 may recommend a location for the sensor 110 and/or an attachment methodology (e.g., magnetic, stud mounting, adhesive attachment, etc.) appropriate for that particular piece of machinery.

For example, the user may be able to connect to the web services 150 prior to placing the sensor 110 to determine where an optimum position to place the sensor 110 would be. For example, the user may connect to the web services 150 via a web browser 186 and enter a type of machinery being monitored. The web services 150 may responsively indicate to the user where, and/or how many, sensors 110 should be placed on the machinery. In some embodiments, the web services 150 may illustrate a picture of the machinery showing where the sensors 110 should be placed.

In some embodiments, the web services 150 may determine an identification of the industrial equipment based on a photo of the machine's nameplate, which has been run through an optical character recognition algorithm to yield the manufacturer name and model number. In some embodiments, the user may be able to take a picture of the machinery and/or an identifying piece of the machinery and the web services 150 will identify the machinery and indicate placement locations of the sensors 110. For example, the user may take a photo of an identification plate of the machinery and upload the photo to the web services 150. The web services 150 may responsively determine an identification of the machinery via the photo (e.g. via a part number or other identification indicated in the photo) to determine placement locations for the sensors 110. In some embodiments, the web services 150 may determine the identification of the machinery by pattern matching the machinery indicated in the uploaded photo with other, similar, types of machinery. For example, the web services 150 may look up the industrial equipment based on a photo of the machine as a whole (or one part of the machine), run through neural networks which have been trained against a catalog of machine types, to yield the manufacturer name and model number.

In some embodiments, once sensors 110 have been placed on the machine, the user can take photos of those installed sensors 110 and upload those photos to the web services 150. Then, those photos can be analyzed (e.g., automatically using neural networks), and the user can receive feedback indicating whether those sensors 110 have been properly placed. In some embodiments, measurements obtained from the sensors 110 can be used to determine whether the sensors 110 have been properly installed. For example, the constant gravitational effect on an accelerometer of the sensor 110 could be used to determine that the sensor 110 has been installed upside down or at some other suboptimal angle. In some embodiments, certain vibrations detected on the accelerometer's X and Y axes (which should instead be seen along its Z axis) can trigger notification to the user that the sensor 110 should be installed differently.

Figure 2:
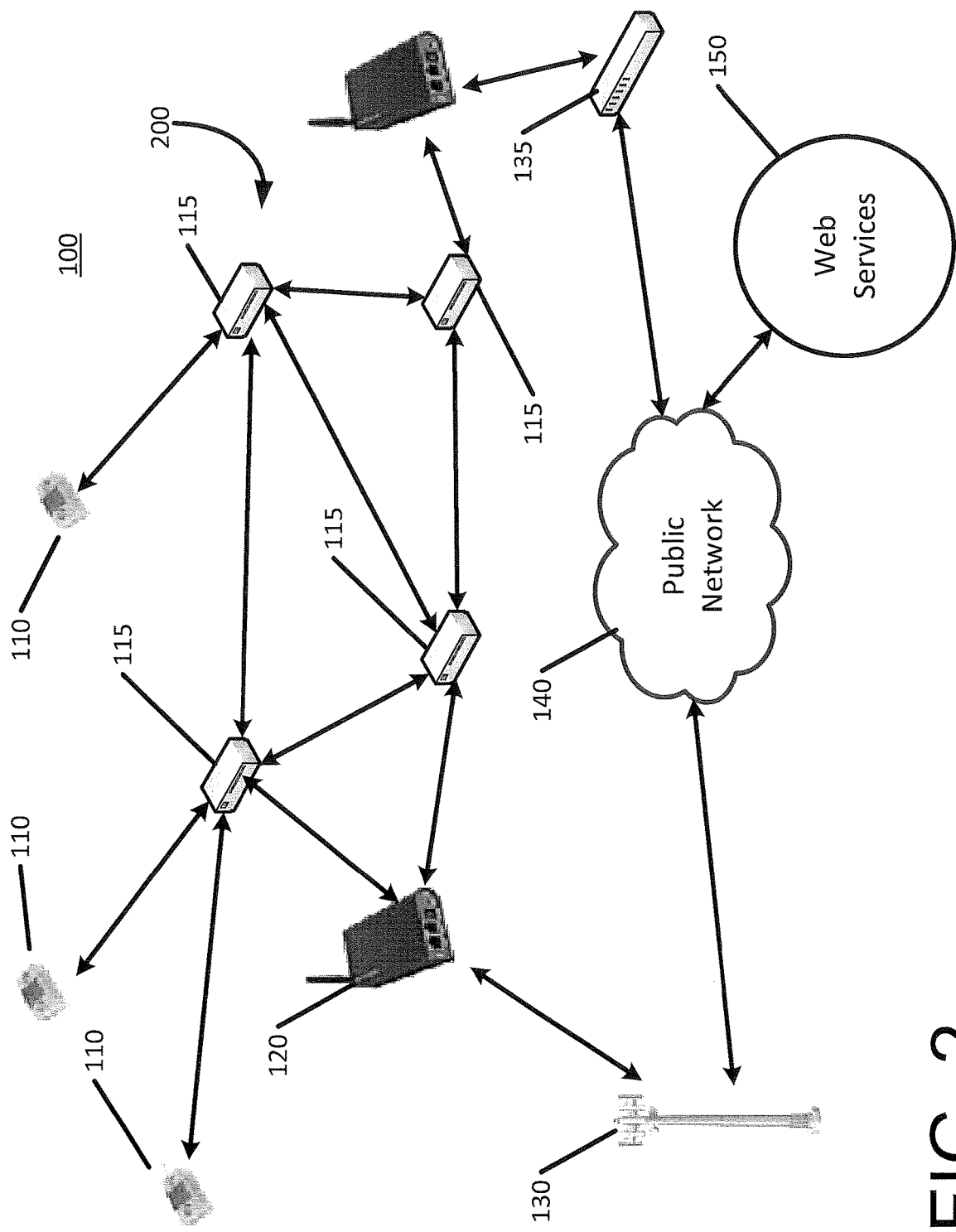
FIG. 2 illustrates another embodiment of the monitoring system according to embodiments of the present inventive concepts.

FIG. 2 illustrates another embodiment of the monitoring system 100 according to embodiments of the present inventive concepts.

As illustrated in FIG. 2, the monitoring system 100 may include the sensors 110 and gateways 120 as described herein. In addition, the monitoring system 100 may include repeaters 115. The repeaters 115 may be configured to communicate with other repeaters 115 and/or one or more gateways 120 over communication networks 240. The communication networks 240 may include, for example, WiFi (e.g., IEEE 802.11 and variants thereof), USB, IEEE 1394, Bluetooth, Bluetooth Low-Energy, a power line network (PLN), electrical wiring, and/or various forms of radio, though the present inventive concepts are not limited thereto. The combination of repeaters 115 and gateways 120 may form a mesh network 200 that allows redundant paths between the sensors 110 and the web services 150.

The mesh network 200 of repeaters 115 and gateways 120 may form dynamically. For example, when first powered on, a repeater 115 may determine whether other repeaters 115 and/or gateways 120 are within range. The repeater 115 may determine a signal strength of the received signals to determine to which repeaters 115 and/or gateways 120 the repeater 115 will connect. For example, in some embodiments, the repeater 115 may connect to all repeaters 115 within signal range and/or to a gateway 120 that has the strongest signal. In some embodiments, a repeater may connect to more than one gateway 120. In some embodiments, the mesh network 200 may also be statically configured by a network administrator. In other words, in some embodiments the network of repeaters 115 and gateways 120 may be dynamically determined, may be statically configured, or may be a combination of both. A repeater 115 may be configured to automatically connect to another repeater 115 and/or gateway 120 if a connection to an existing repeater 115 and/or gateway 120 is lost.

The repeaters 115 may be configured to dynamically pass data traffic through the mesh network 200 to gateways 120, potentially through other repeaters 115, to access the cloud network 140 and the web services 150. In some embodiments, the network of repeaters 115 may be configured to allow only a single path through the mesh network 200 to a gateway 120. For example, the repeaters 115 may execute a protocol similar to spanning tree protocol (STP) to prevent loops from being formed in the mesh network 200.

The repeaters 115 may be configured to hold data traffic in the event a portion of the mesh network 200 goes down. For example, the repeater 115 may detect that all current outgoing connections to other repeaters 115 and/or gateways 120 are not available. The repeater 115 may be configured to hold data traffic received over incoming connections from sensors 110 and/or other repeaters 115 until connections to another outgoing connection is available.

As illustrated in FIG. 2, the gateways 120 may connect to the cloud network 140 in multiple ways. For example, the gateway 120 may connect to the cloud network 140 through a radio telecommunication network, such as through cell tower 130. In some embodiments, the gateway 120 may connect to the cloud network through an existing wired and/or wireless network, such as through network switch 135. Though the gateway 120 and the repeater 115 are illustrated as separate devices within FIG. 2, it will be understood that the functionalities of the gateway 120 and the repeater 115 can be combined into a single physical device. For example, in some embodiments, the gateway 120 may act as a repeater 115.

In addition to performing networking duties, the gateway 120 may also provide configuration information to the sensors 110. For example, the gateway 120 may provide configuration data to move the sensor 110 between a "low power" mode and a "normal" mode, as discussed herein. The movement between modes may be requested by the gateway 120 and/or the web services 150 responsive to analysis of data received by the gateway 120 and/or the web services 150. Responsive to such analysis, the gateway 120 may provide an indication to the sensor 110 to change its mode of operation. In some embodiments, the gateway 120 may provide configuration data to the sensor 110 to move between a higher frequency resolution (e.g., a higher sampling rate) with a larger amount of data and a lower frequency resolution (e.g., a lower sampling rate) with a smaller amount of data. In some embodiments, the gateway 120 may provide configuration data to the sensors 110 based on configuration options provided by the web services 150.

A given sensor 110 may connect to a gateway 120 and/or a repeater 115. In some embodiments, the sensor 110 may connect to the gateway and/or repeater 115 that has the strongest signal received at the sensor 110. In some embodiments, the sensor 110 may be configured to switch to another repeater 115 and/or gateway 120 if an existing connection to a repeater 115 and/or gateway 120 is lost. In such a way, the mesh network 200 may reorganize if one of the repeaters 115 and/or gateways 120 becomes inoperable and/or unreachable.

The sensor 110 may be configured to store measurements taken until a particular time at which all stored measurements are sent to the repeater 115 and/or gateway 120 with which the sensor 110 is associated. The sensor 110 may receive the schedule of when to send the measurements from the repeater 115 and/or gateway 120 with which the sensor 110 is associated. The repeater 115 and/or gateway 120 may maintain the schedules of the sensors 110 so as to minimize network congestion when data measurements are sent over the mesh network 200. In some embodiments each of the repeaters 115 and/or gateways 120 may have access to the transmission schedules of each of the sensors 110 in the mesh network 200. In this way, any of the repeaters 115 and/or gateways 120 may take over for any other repeater 115 and/or gateway 120 the management of any sensor 110. In some embodiments, the repeaters 115 and/or gateway 120 may transmit the respective transmission schedules of the sensors 110 amongst themselves to share the configuration data throughout the mesh network 200.

The repeaters 115 may be configured to maintain a data repository of the sensors 110 with which the repeaters 115 are in communication. Data directed to a particular sensor 110, such as configuration data from the web services 150, may accordingly be directed to the correct repeater 115 by accessing the various data repositories to determine which repeater 115 is managing the particular sensor 110.

The repeaters 115 and/or gateways 120 may also synchronize the data gathering of the sensors 110. In some embodiments, the repeaters 115 and/or gateways 120 may synchronize clocks of certain ones of the sensors 110 so that the sensors 110 are associated with a common reference clock signal. The repeaters 115 and/or gateways 120 may schedule the sensors 110 to collect data at a particular time so that the measurement data of the sensors 110 are referenced to a substantially simultaneous time. For example, a repeater 115 may configure two sensors 110 on different parts of a single piece of machinery to synchronize some number of measurement data samples. In this way, the monitoring system 100 may receive measurement data from two locations on the machinery that are taken at the same time. This may allow for greater accuracy in prediction and determination of problems with the machinery since the data points are taken at the same time. As used herein, the description of a plurality of sensors 110 taking samples at the same time is intended to mean that the plurality of sensors 110 may take samples with less than a second deviation in between the timestamps of respective pairs of samples.

An industrial facility may typically be made up of many independently installed machines. These machines are often interconnected using some sort of a powertrain arrangement (e.g., a motor drives a gearbox that is connected via a shaft which traverses a bearing).

Conventionally, vibration analysis of industrial equipment may be performed on each machine, and parts of the machine, independently. For example, conventional analysis may look at a motor in isolation from a mechanically and/or operationally coupled gearbox or bearing.

As appreciated by the inventors, an additional class of problems can be caught by monitoring multiple machines simultaneously, and looking for changes in the relationship between these measurements, in addition to the measurements themselves. For example, analysis over an operating interval of the machinery may determine that vibration levels of a motor and a gearbox typically move synchronously with one another. However, subsequent monitoring may determine that the motor vibration increases at the same time that gearbox vibration drops sharply. Analysis of these measurements may indicate a problem with the mechanical linkage between those two devices. As another example, it may be determined that the relationship of vibration amplitude between two machines and/or parts of a single machine remains constant, but the amount of phase shift between them changes. Such a measurement may indicate yet a different class of problems.

Conventionally, vibration analysis of industrial equipment may be performed by manual measurement of one piece of equipment at a time, using a single sensor which an operator moves from machine to machine as measurements are taken. In this arrangement, it is difficult to see real-time relationships between machine measurements.

In a manufacturing environment, hard-wired sensors may be expensive to install and difficult to move, limiting their flexibility. The use of sensors which connect wirelessly and use battery power may increase flexibility. One challenge with providing multiple battery-powered wireless sensors to provide synchronous measurements across multiple parts of a machine is that synchronizing the measurements may be difficult due to wireless network contention and "jitter" (e.g., packet delay variance). Wireless network contention may include delays due to contention of multiple wireless devices for access to the limited resources of the wireless network, including interference thereof. Network jitter may include varying packet delay(s) based on CPU, memory, or bus contention within individual devices on the network.

In order to capture simultaneous time-synchronized sample sets in spite of network contention and jitter, the capture of samples may be scheduled across multiple sensors 110 to occur simultaneously. The distribution of sampling schedules to the sensors 110 may occur asynchronously (e.g., the gateway 120 may communicate to one sensor 110 at a time, well before the samples need to be captured). Similarly, the retrieval of the sampled data afterwards may occur asynchronously (e.g., the gateway 120 may receive the sampling data from one sensor 110 at a time, at some point after the samples have been captured). However, since the data may be captured simultaneously across multiple sensors 110, precisely timed comparisons across sensors 110 can be performed after the data capture.

In order for the sample captures to be scheduled precisely, each sensor 110 may have its own high-resolution clock. Conventionally, in networked systems, there may be an attempt to adjust each participant's clock to a common time using approaches like Network Time Protocol. The system of the present inventive concepts may obtain more precise synchronization (with less work required by each sensor 110) by allowing the clock of the sensor 110 to run independently. The sensors 110 may periodically inform the gateway 120 of their current high-resolution clock time. The gateway 120 may maintain a table relating received clock times of a sensor 110 to a common reference clock (e.g., a clock of the gateway 120, or a common reference clock signal shared among a plurality of gateways 120). The gateway 120 may use this table to adjust the timing of each sample capture received from one or more sensors 110. For example, the gateway 120 may maintain a clock offset for individual ones of the sensors 110 that provide samples to the gateway 120. By adjusting the samples provided from a sensor 110 by the clock offset associated with that sensor 110, the times associated with the samples may be adjusted to the reference clock of the gateway 120. For example, the times associated with individual samples from a plurality of sensors 110 may indicate different times. However, since individual ones of the plurality of sensors 110 have respective clock offsets from the common reference clock, it may be determined that the individual samples were performed substantially simultaneously.

For example, a gateway 120 may wish to schedule simultaneous data captures from a first and a second sensor 110. For example, the gateway 120 may wish to schedule simultaneous data capture from sensors 110 that are located on the same machine. In some embodiments, the gateway 120 may determine that the sensors 110 are located on the same machine based on user input. In some embodiments, the gateway 120 may determine that the sensors 110 are located on the same machine based on a measurement of radio (or other) signals from the sensors 110. The gateway 120 may determine that the clock of the first sensor 110 is five seconds ahead of the clock of the gateway 120, while the second sensor 110 is five seconds behind the clock of the gateway 120. If the gateway 120 wants to schedule a data capture at time A, the gateway 120 may indicate to the first sensor 110 that measurements should be taken at time (A plus five seconds) according to the clock of the first sensor 110 and to the second sensor 110 that measurements should be taken at time (A minus five seconds) according to the clock of the second sensor 110. Similarly, if the gateway 120 receives a first data sample from the first sensor 110 that was collected at (B plus five seconds) according to the clock of the first sensor 110 and a second data sample from the second sensor 110 that was collected at (B minus five seconds) according to the clock of the first sensor 110, the gateway 120 may determine that the two data samples were taken at substantially the same time (time B according to the clock of the gateway 120). Thus, the gateway 120 can use the individual offsets of the sensors 110 from a common reference clock to both schedule and correlate data samples. In some embodiments, the use of the clock offset may enable the gateway 120 to maintain sub-second calibration of the sensors 110. In some embodiments, the gateway 120 may be able to calibrate measurements between the sensors 110 within less than 1 millisecond.

As described herein, even though the data may be taken at substantially the same time, it may be reported asynchronously. In other words, the measurement data may be held for some amount of time before being reported to the web services 150. Because the measurement data contains timestamps for the data samples, the web services 150 may be able to reconstruct, and compare, the various samples taken at the same time even though the data samples were received by the web services 150 at different times.

Figure 3:
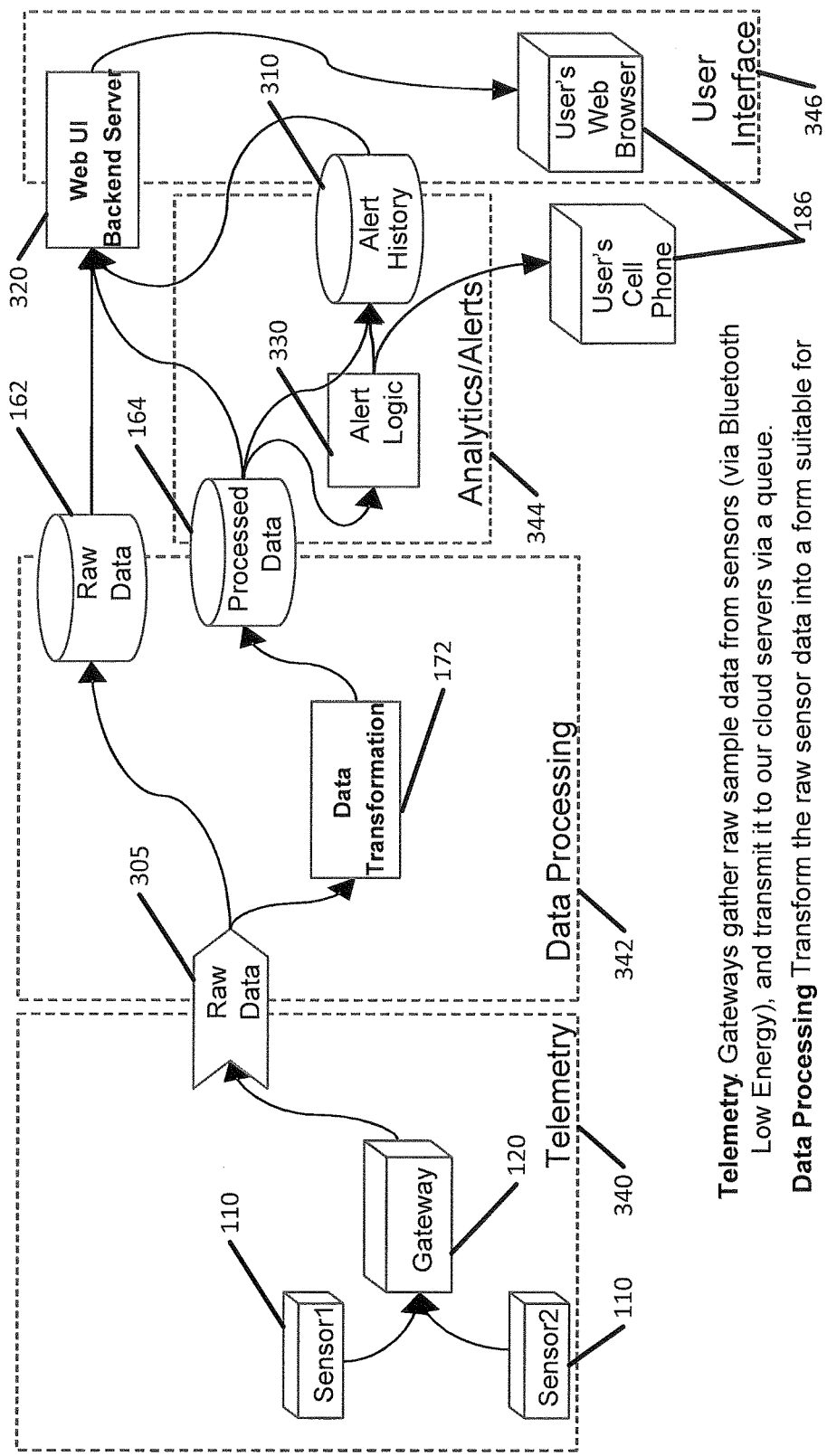
FIG. 3 illustrates a monitoring system providing multi-axis vibrational measurement with cloud-based predictive analysis according to embodiments of the present inventive concepts.

FIG. 3 illustrates a monitoring system 100 providing multi-axis vibrational measurement with cloud-based predictive analysis according to embodiments of the present inventive concepts. For discussion's sake only, the monitoring system 100 can be divided into four stages: telemetry 340, data processing 342, analytics 344, and user interface 346.

During the telemetry stage 340, the various sensors 110 collect measurement data, including vibrational measurements. This measurement data is then provided by the sensors 110 to the various gateways 120. In some embodiments, this measurement data may be provided through repeaters 115 to the gateways 120 (see FIG. 2). The data may be provided by the sensors 110 to the gateways 120 wirelessly, for example, by Bluetooth Low Energy. The gateways 120 may queue up the measurement data received from the sensors 110 in a raw sensor data cloud queue 305 and provide it to the web services 150 through the cloud network 140. As used herein, a cloud queue may be a messaging interface used to store messages transmitted between entities in a cloud. In some embodiments, the cloud queue may receive messages from a sender and store the messages until received from the cloud queue by a receiver. In some embodiments, the cloud queue take a first-in, first-out model (FIFO) in which a first message queued up by a sender is the first message received from the cloud queue by the receiver. Though cloud queues are described herein, it will be understood that other messaging systems and/or data repositories may be used without deviating from the present inventive concepts.

Figure 4:
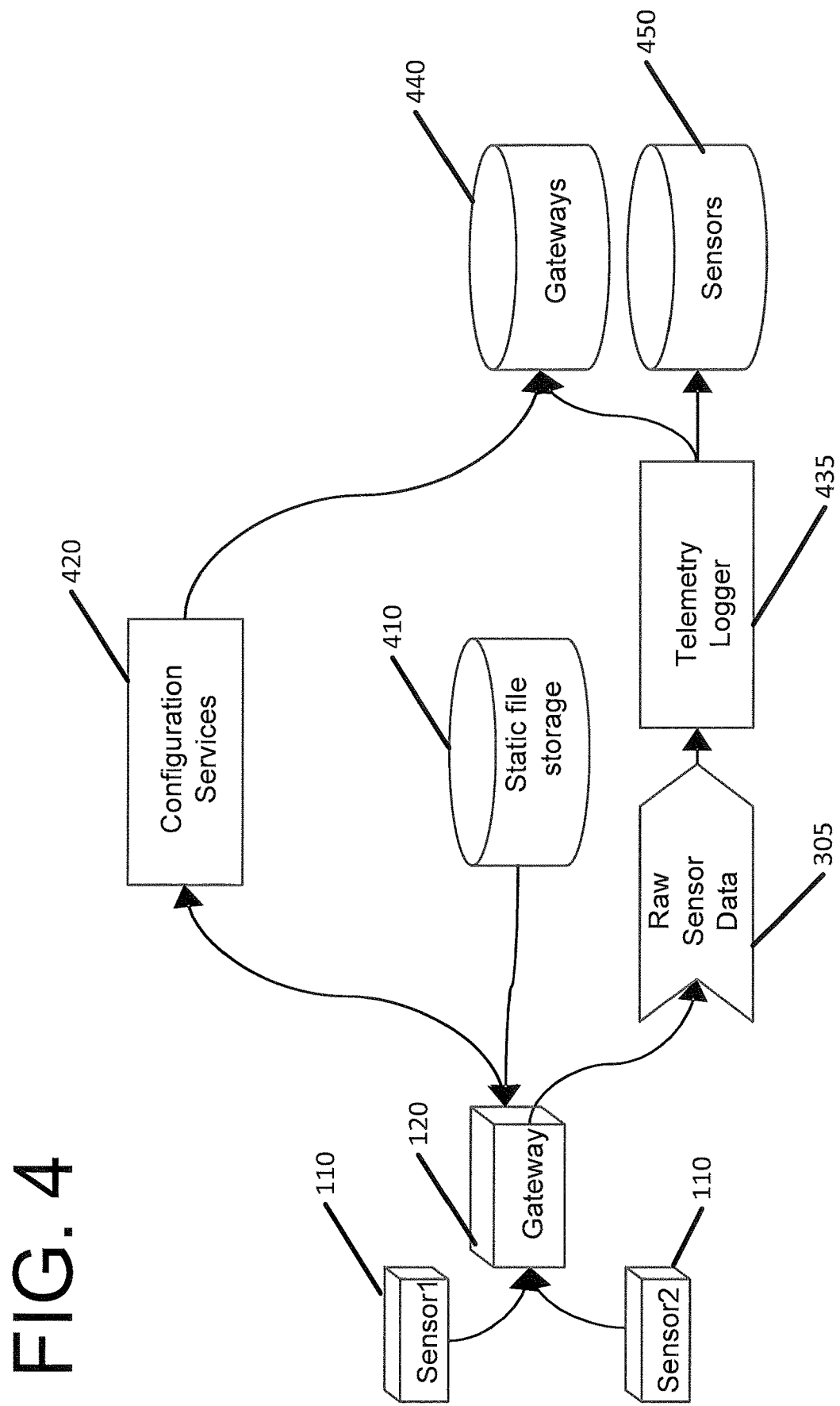
FIG. 4 illustrates a detailed view of an embodiment of the telemetry stage illustrated in FIG. 3 according to embodiments of the present inventive concepts.

FIG. 4 illustrates a detailed view of an embodiment of the telemetry stage 340 illustrated in FIG. 3 according to embodiments of the present inventive concepts. As illustrated in FIG. 4, the gateways 120 may pass data received from sensors 110 into a raw sensor data cloud queue 305. The raw sensor data cloud queue 305 may then be processed by computer processes such as the telemetry logger computer process 435 of FIG. 4. The telemetry logger computer process 435 may process the raw sensor data cloud queue 305 to parse the raw sensor data into gateway-specific status data 440 and sensor-specific status data 450. The gateway-specific status data 440 may be data related to operation of the gateways 120 such as, for example, location, temperature, operational status, last reporting time, firmware versions, signal strength, sensors being serviced, etc. The sensor-specific status data 450 may be data related to measurements made by the sensors 110 such as the current sampling rate, any reported errors, battery status, last reporting time, firmware version, signal strength, gateways being accessed, etc. Though the telemetry logger computer process 435 is illustrated as a single element, the use of multiple computer processes may be provided without deviating from the present inventive concepts.

As illustrated in FIG. 4, the gateways 120 may also receive data from static file storage 410. The static file storage 410 may include, for example, configuration information, firmware updates, and/or other operational data for the gateway 120.

Other computer processes, such as the configuration services computer process 420 may also be in communication with the gateway 120. The configuration services computer process 420 may query the gateway 120 for other operational parameters such as the number of sensors 110 being communicated with, the status of the interconnected network at the customer site, etc. This additional data may also be stored, for example as part of the gateway-specific data 440. The configuration services computer process 420 may also control configuration of the gateway 120. For example, the configuration services computer process 420 may control which configuration file is used for a particular gateway 120.

FIG. 4 also illustrates an order in which a monitoring system 100 according to embodiments of the present inventive concepts may operate. For example, as illustrated in FIG. 4, when first powered on, a gateway 120 of the monitoring system 100 may access the configuration services computer process 420 to receive configuration information related to operation of the gateway 120. For example, the gateway 120 may receive an update to its operational code. The gateway 120 may next access the static file storage 410 to retrieve any additional data needed for operation, such as scheduling data, sampling frequency data, etc. Next, the gateway 120 may receive sensor data from the sensors 110. The gateway 120 may next provide this sensor data to the raw sensor data cloud queue 305. The telemetry logger computer process 435 may next parse this raw sensor data cloud queue 305 to store additional gateway-specific status data and sensor-specific status data 450 related to the sensor data.

Figure 5:
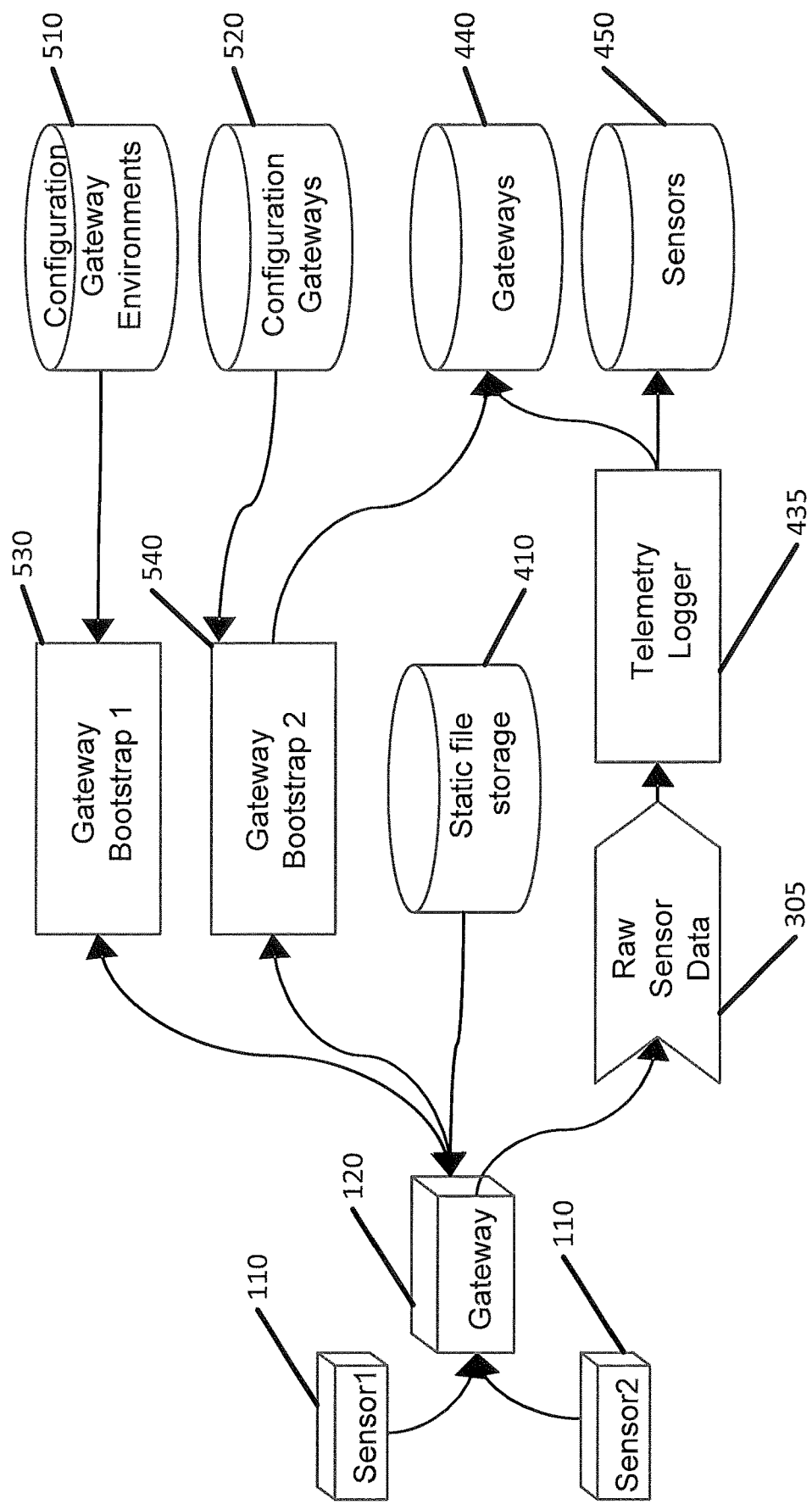
FIG. 5 illustrates a detailed view of another embodiment of the telemetry stage of FIG. 3 according to embodiments of the present inventive concepts.

FIG. 5 illustrates a detailed view of another embodiment of the telemetry stage 340 of FIG. 3 according to embodiments of the present inventive concepts. FIG. 5 provides additional detail related to the configuration services computer process 420 illustrated in FIG. 4. As illustrated in FIG. 5, the configuration services computer process 420 may include Gateway Bootstrap 1 computer process 530 and Gateway Bootstrap 2 computer process 540. The Gateway Bootstrap 1 computer process 530 may access a data repository such as the configuration gateway environments data repository 510 illustrated in FIG. 5. The configuration gateway environments data repository 510 may indicate which environment of a plurality of environments should be configured for the gateway 120. The Gateway Bootstrap 2 computer process 540 may access a data repository such as the configuration gateways data repository 520 illustrated in FIG. 5. The configuration gateways data repository 520 may indicate a particular configuration for the gateway 120 responsive to the environment selected by the Gateway Bootstrap 1 computer process 530.

For example, the configuration gateway environments data repository 510 may indicate that a particular environment of the monitoring system 100 should run in a development versus a production environment. In some embodiments, the configuration gateway environments data repository 510 may indicate that a particular environment of the monitoring system 100 should run in a more fault-tolerant versus a more strictly enforced environment. Responsive to the designation of the environment by the Gateway Bootstrap 1 530 computer process, the Gateway Bootstrap 2 computer process 540 may select a particular configuration from the configuration gateways data repository 520 to provide to the gateway 120. The configuration may include particular configurations settings and/or particular operating code (e.g. specific firmware). The gateway 120 may then update and/or operate in accordance with the selected environment.

In some embodiments, the gateway 120 may access the bootstrapping process for its configuration information every time the gateway 120 powers on. In this way, the configuration of the gateway 120 may be refreshed with each power cycle. This can avoid errors that might accumulate over long periods of runtime. In some embodiments, the gateway 120 may be configured to automatically reset itself (e.g. to an initial state) after a predetermined duration has passed (e.g. once a day). In this way, the gateway 120 can be forced to refresh its configuration at least once during the predetermined duration. In some embodiments, the automatic reset may also reset the code level (e.g. firmware) to an initial state. After the reset, the gateway 120 may automatically download firmware upgrades that are available. This automatic reset can help ensure that changes to the configuration may take effect relatively quickly without additional action being taken by the user. In some embodiments, the sensors 110 may also be configured to automatically reset their configuration and/or code in a manner similar to that described herein with respect to the gateway 120.

The sensors 110 may be microprocessor-controlled and may contain software instruction code(s) (e.g., firmware) that govern behavior of the microprocessor (see, e.g., processor 1120 of FIG. 11) and interconnected electronics. These instructions can be held in any type of memory and/or storage (see, e.g., storage 1140 of FIG. 11), including nonvolatile "flash" memory, and the instructions may persist without the application of electrical power. In some embodiments, some or all of the instructions can be programmatically updated. Though the instructions may be stored in flash memory, the present inventive concepts are not limited thereto. In some embodiments, this memory may be within the same chip as the microprocessor, or on a separate chip.

Manufacturers of microprocessor-controlled devices may occasionally distribute firmware updates which may include new versions of the software instruction code(s), intended to be loaded into the device's storage either automatically or through manual user intervention. The software instruction code(s) of the firmware may represent operating code (e.g., an operating system) to be executed by the microprocessor. The microprocessor may boot the firmware (e.g., the operating system) to execute code to implement the operations of the device.

A danger of firmware updates is colloquially referred to as "bricking" the updated devices, in which the application of a firmware update puts the device into a state where it no longer works properly and/or does not allow the application of additional firmware updates. This can be the result, for example, of a faulty update software package, or a fault during the application of that update, or both.

In order to allow for recovery of "bricked" devices, some devices include a "factory reset" function, in which a user can manually reload an earlier version of the firmware into storage (e.g., by activating a physical switch on the device), either from a different location within the same storage location or a separate storage location (e.g., a separate ROM chip). This is suboptimal in that it requires both (a) manual user action, and (b) presence of a physical switch to accept that user action.

In some embodiments, sensors 110 and/or gateways 120 may handle recovery without requiring either manual user action or presence of a physical switch. Without user intervention, and without any external trigger beyond a timer signal generated within the device (e.g., the sensor 110 and/or gateway 120) itself, the device may perform a factory reset on itself (e.g., the as-manufactured version of the firmware that the device was programmed with at time of manufacture may be copied into active use). That as-manufactured version of the firmware may be sufficient for the device to contact the web services 150, submit its unique identifier, and retrieve instructions on what version of the firmware it should be running. At that point the device can either continue to run a version of the firmware it has already installed (e.g., the as-manufactured firmware), or download a new version of the firmware from the web services 150.

In some embodiments, the device may postpone this self-factory-reset action, but only upon receipt of positive acknowledgment (from the web services 150 or another device, such as a sensor 110 and/or gateway 120, with which it is in communication) that it should continue to run the version of the firmware it is currently running. For example, in some embodiments, a device such as a sensor 110 and/or gateway 120 may boot and send a network communication requesting a confirmation of the appropriate firmware to be running. If the device does not receive a positive response, or any response, within a certain predetermined time period, the device may implement a self-reset to the as-manufactured firmware level. After booting to the as-manufactured firmware level, the device may inquire again as to what the appropriate level of firmware should be and, if necessary, begin a firmware update. In this way, errors in the firmware which may lead to communication issues, or other types of behavior that can lead to "bricking" the device, may be automatically corrected without user intervention and/or significant downtime. The above mechanisms may be used for various types of devices that are part of the monitoring system 100, including (but not limited to) sensors 110 and gateways 120.

Though FIG. 5 illustrates that a gateway 120 accesses external servers to receive configuration information, it will be understood that similar infrastructure may be provided for repeaters 115. In other words, repeaters 115 (see FIG. 2) may also use bootstrap configurations to receive initial configuration information when first booting. Similarly, the repeaters 115 may be configured to reboot themselves periodically to force the refresh of the configuration information.

Referring back to FIG. 3, during the data processing stage 342, the data processing operations 172 may access the raw sensor data cloud queue 305 from the gateways 120 to process the sensor data. The data processing operations 172 may generate processed sensor data 164, which may be stored in a data repository. The raw sensor data 162 may also be saved in a data repository. In some embodiments, the raw sensor data 162 and the processed sensor data 164 may be stored in the same data repository. In some embodiments, the raw sensor data 162 and the processed sensor data 164 may be stored in different data repositories. Both the raw sensor data 162 and the processed sensor data 164 may be maintained so that a historical record of the data from the sensor 110 may be analyzed.

Figure 6:
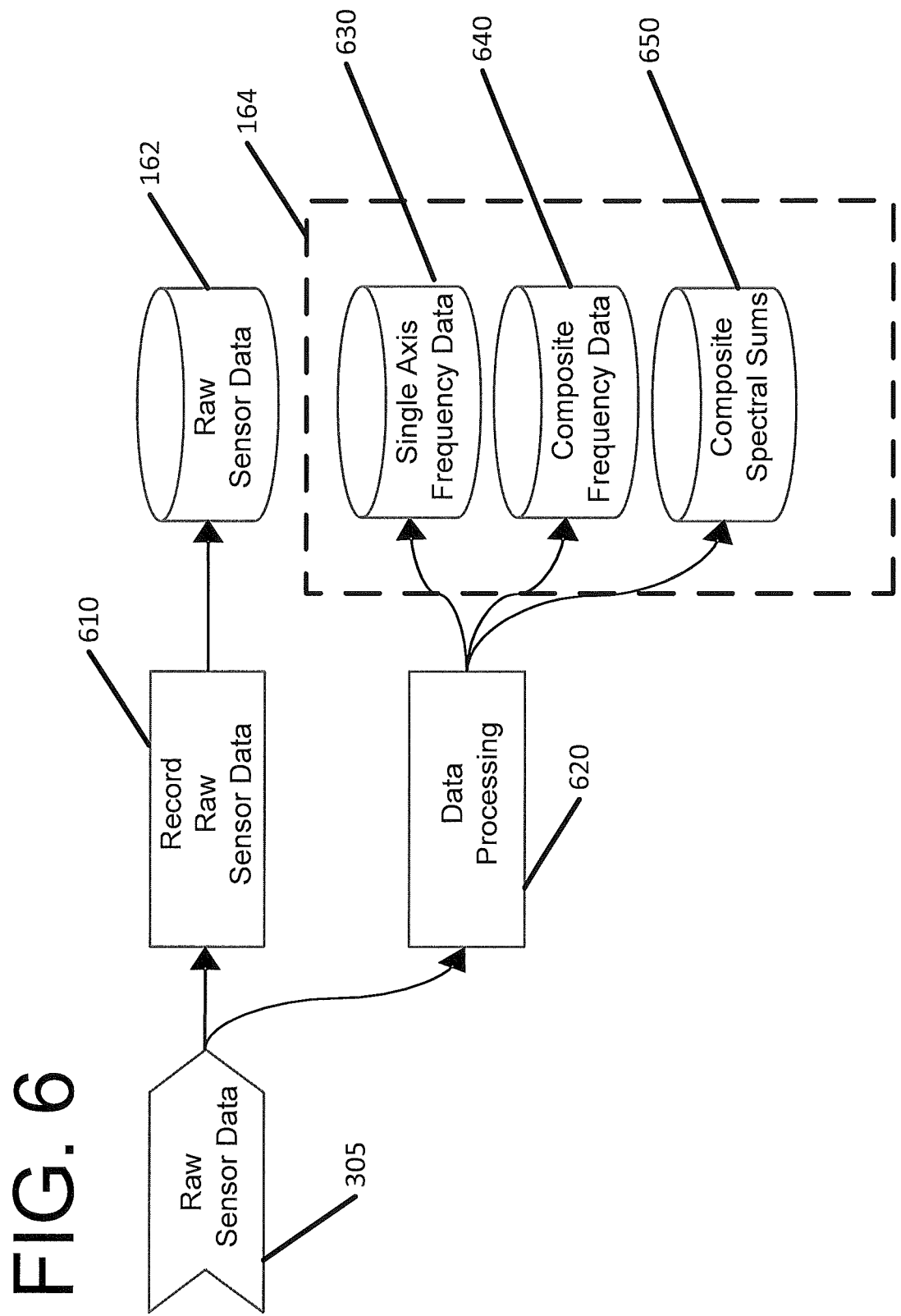
FIG. 6 illustrates a detailed view of the data processing stage of FIG. 3 according to embodiments of the present inventive concepts.

FIG. 6 illustrates a detailed view of the data processing stage 342 of FIG. 3 according to embodiments of the present inventive concepts. As illustrated in FIG. 6, the raw sensor data cloud queue 305 may be processed by a computer process, such as a Record Raw Sensor Data computer process 610, to move the raw sensor data from the raw sensor data cloud queue 305 into a data repository to provide the stored raw sensor data 162.

In addition, the raw sensor data cloud queue 305 may be processed by a computer process, such as data processing computer process 620, to generate processed sensor data 164 associated with the raw sensor data. For example, the computer process may analyze the raw sensor data to determine specific associated data, such as single-axis frequency data 630, composite frequency data 640, and composite spectral sums 650.

In some embodiments, the single-axis frequency data 630 may include data, per sensor 110, related to recorded measurements, per frequency, in each of the axes in which the sensor 110 is capable of measuring. Single axis frequency data 630 may include, for each sample set, vibration data from a single axis on the sensor 110, transformed into the frequency domain. For example, the single-axis frequency data 630 may show that a particular sensor 110 measured, at a particular time instance, a vibration of a particular frequency in an axis parallel to a surface of the machinery being monitored.

In some embodiments, the composite frequency data 640 may combine, for each sample set, vibration data from all axes for a particular frequency in the frequency domain. For example, the composite frequency data 640 may provide an indication of the overall 3-dimensional vibration at a particular frequency, rather than limited to a single spatial dimension.

In some embodiments, the composite spectral sums 650 may include, for each sample set, a sum of the composite frequency data value across all frequencies. The composite spectral sum may provide a single number indicating the overall vibration at a plurality of frequencies, across a plurality of spatial dimensions.

Figure 7:
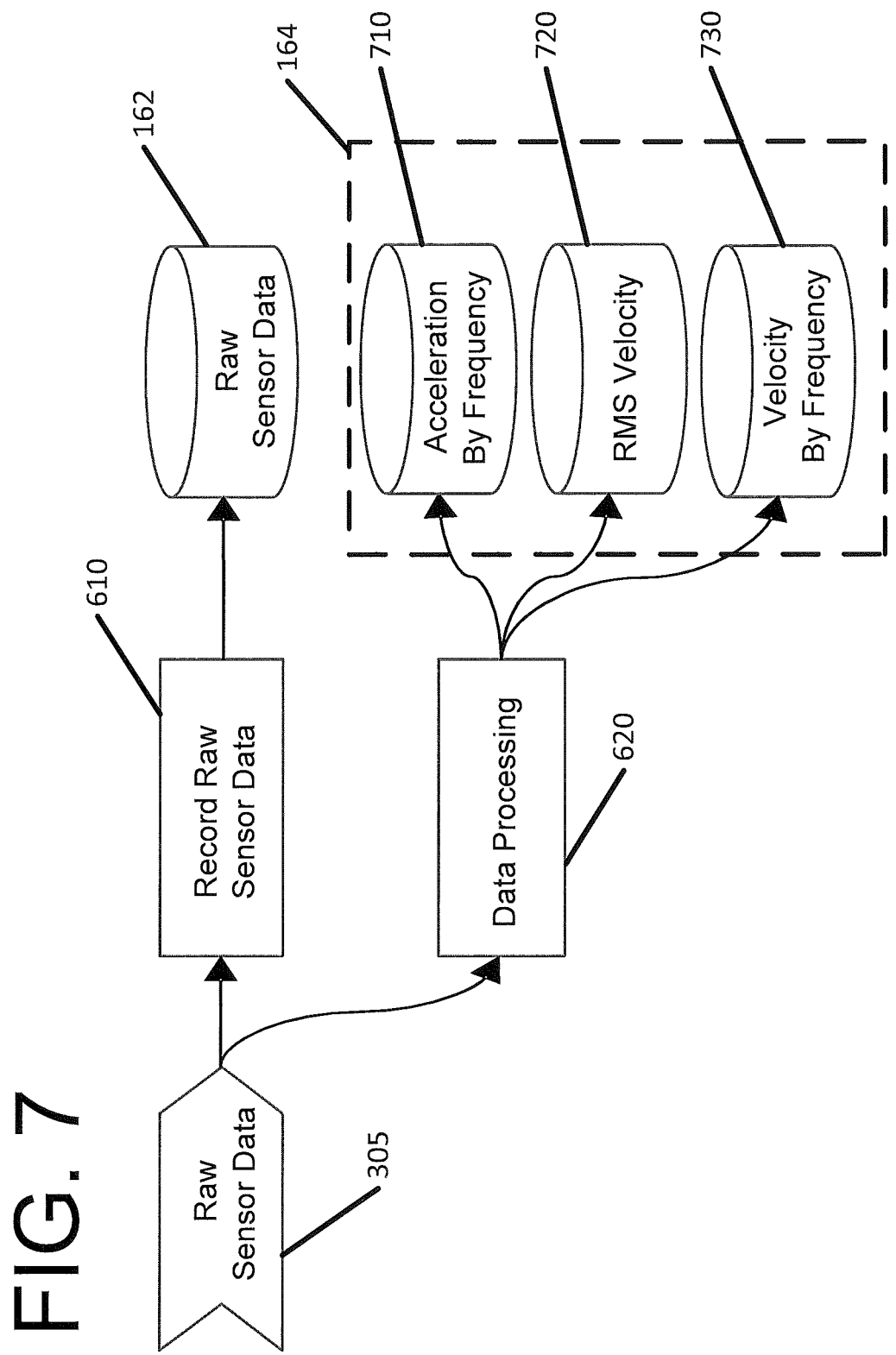
FIG. 7 illustrates a detailed view of another embodiment of the data processing stage of FIG. 3 according to embodiments of the present inventive concepts.

FIG. 7 illustrates a detailed view of another embodiment of the data processing stage 342 of FIG. 3 according to embodiments of the present inventive concepts. FIG. 7 provides additional data options associated with the data processing computer process 620 illustrated in FIG. 6. As illustrated in FIG. 7, the data processing computer process

620 may generate processed sensor data 164 instead of, or in addition to, the processed sensor data 164 described with respect to FIG. 6. For example, the data processing computer process 620 may provide processed sensor data 164 including acceleration by frequency data 710, RMS velocity data 720, and velocity by frequency data 730.

The acceleration by frequency data 710 may indicate, for a particular sensor 110, vibration data from a single axis on a sensor 110, transformed into the frequency domain. In some embodiments, the acceleration by frequency data 710 may be similar to the single axis frequency data 630 described herein with respect to FIG. 6.

The velocity by frequency data 730 may indicate, for a particular sensor 110, the velocity that is determined at each frequency for a given axis. For example, the velocity by frequency data 730 (v) may be determined using the acceleration by frequency data 710 (a) and the frequency (f) using the equation, v=a/f.

The RMS velocity data 720 may indicate a root-mean-square value of the velocity by frequency data. The RMS velocity data 720 may be calculated as the Root Mean Squared of the velocity component at each frequency. While the velocity by frequency data 730 may describe the velocity at each frequency, the RMS velocity data 720 may describe the overall velocity across all frequencies. In some embodiments, the RMS velocity data 720 may be computed according to particular standards, such as ISO 10816-1:1995, "Mechanical vibration—Evaluation of machine vibration by measurements on non-rotating parts," or ISO 20816-1:2016, "Mechanical vibration—Measurement and evaluation of machine vibration."

As indicated, these additional data values may be generated in addition to, or instead of, data values described previously with respect to other figures. It will be understood that other types of data values and data representations associated with machinery management may also be included. For example, in some embodiments, the data may also include peak velocity data in addition to, or instead of, the RMS velocity data 720.

Referring back to FIG. 3, during the analytics phase 344, the processed sensor data 164 and the raw sensor data 162 may undergo alert operations 330. The alert operations 330 may examine both the current data from the sensor 110 and the historical data from the sensor 110 to determine a current status of the machinery associated with the sensor 110. In some embodiments, the alert operations 330 may also examine current and/or historical data from other sensors to determine the current status of the machinery. Such other sensors may include, for example and without limitation, weather sensors, atmospheric sensors, or other type of external sensors beyond sensors 110 attached to the machinery. Responsive to the determination of the current status, alerts may be sent out as described herein. For example, text alerts may be sent to a user's cell phone if a current status of the machinery is deemed important. Alerts that are generated may be stored in an alert history 310.

Figure 8:
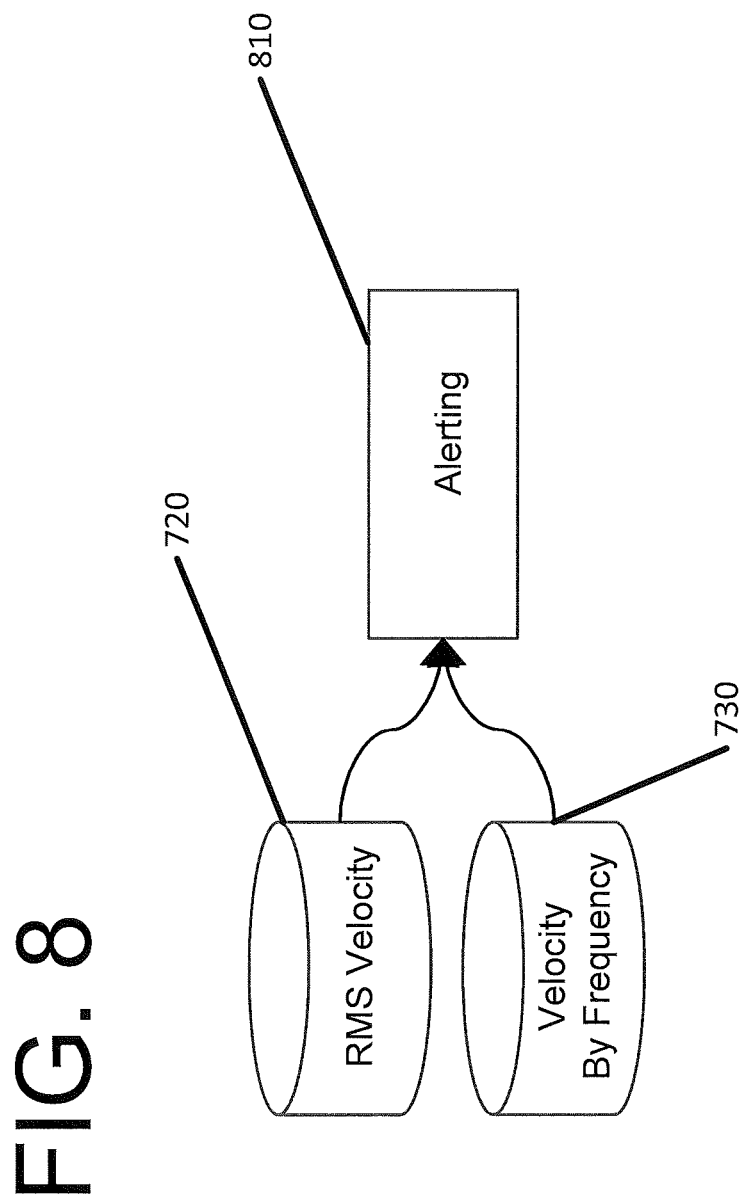
FIG. 8 illustrates a detailed view of the analytics phase of FIG. 3 according to embodiments of the present inventive concepts.

FIG. 8 illustrates a detailed view of the analytics phase 344 of FIG. 3 according to embodiments of the present inventive concepts. As illustrated in FIG. 8, an alerting computer process 810 may analyze previously created data sets, such as RMS velocity 720 and/or velocity by frequency 730. It will be understood that these are only example data sets that may be analyzed and that other data sets may be accessed instead of, or in addition to, the RMS velocity 720 and/or velocity by frequency 730.

The alerting computer process 810 may analyze the data sets and determine that a condition exists on the machinery being monitored that requires additional processing. For example the alerting computer process 810 may determine that a velocity of the machinery being monitored is too high. As another example, the alerting computer process 810 may determine that an acceleration by frequency (e.g. from acceleration by frequency data 710) is too high. In some embodiments, the alerting computer process 810 may analyze more than one data set to make its determination. For example, the alerting computer process 810 may look at both the velocity by frequency 730 and the RMS velocity 720 in conjunction with one another to determine that a velocity at a particular frequency for the machinery being monitored is outside the specified velocity. In some embodiments, the alerting computer process 810 may analyze the single axis frequency data (see FIG. 6) to determine that vibration in a particular axis being measured is too high.

Responsive to determining that the condition exists, the alerting computer process 810 may transmit an alert to the user of the monitoring system 100. As described herein, the alert may be, for example, a text message and/or email. The alert may be categorized, e.g. the alert's relative importance, based on the data analyzed by the alerting computer process 810.

Referring back to FIG. 3, the user interface stage 346 may allow a user of the monitoring system 100 to view the current status of the machinery. The user interface may include a web server 320 that is accessible by a web browser of the user. The web server 320 may allow the user to view a current status of the machinery, past raw sensor data 162, past processed sensor data 164, the alert history 310 and/or other relevant data. For example, the web server 320 may allow the user to store, and later access, current photos of the machinery in operation. In some embodiments, the web server 320 may allow the user to store maintenance records and/or other types of data that might be pertinent to the upkeep of the machinery. In some embodiments, the service may store photos/videos of maintenance procedures, which may have been provided by the user and/or a third party. In some embodiments, the monitoring system 100 may provide the user a way to share historical data with a third party for further analysis. Though the user may access the provided data via the web server 320, it will be understood that other access mechanisms may be available. In some embodiments, HTTP transport protocols or other modes of communication may be provided to provide the data in other formats and/or via other technical mechanisms.

Figure 9:
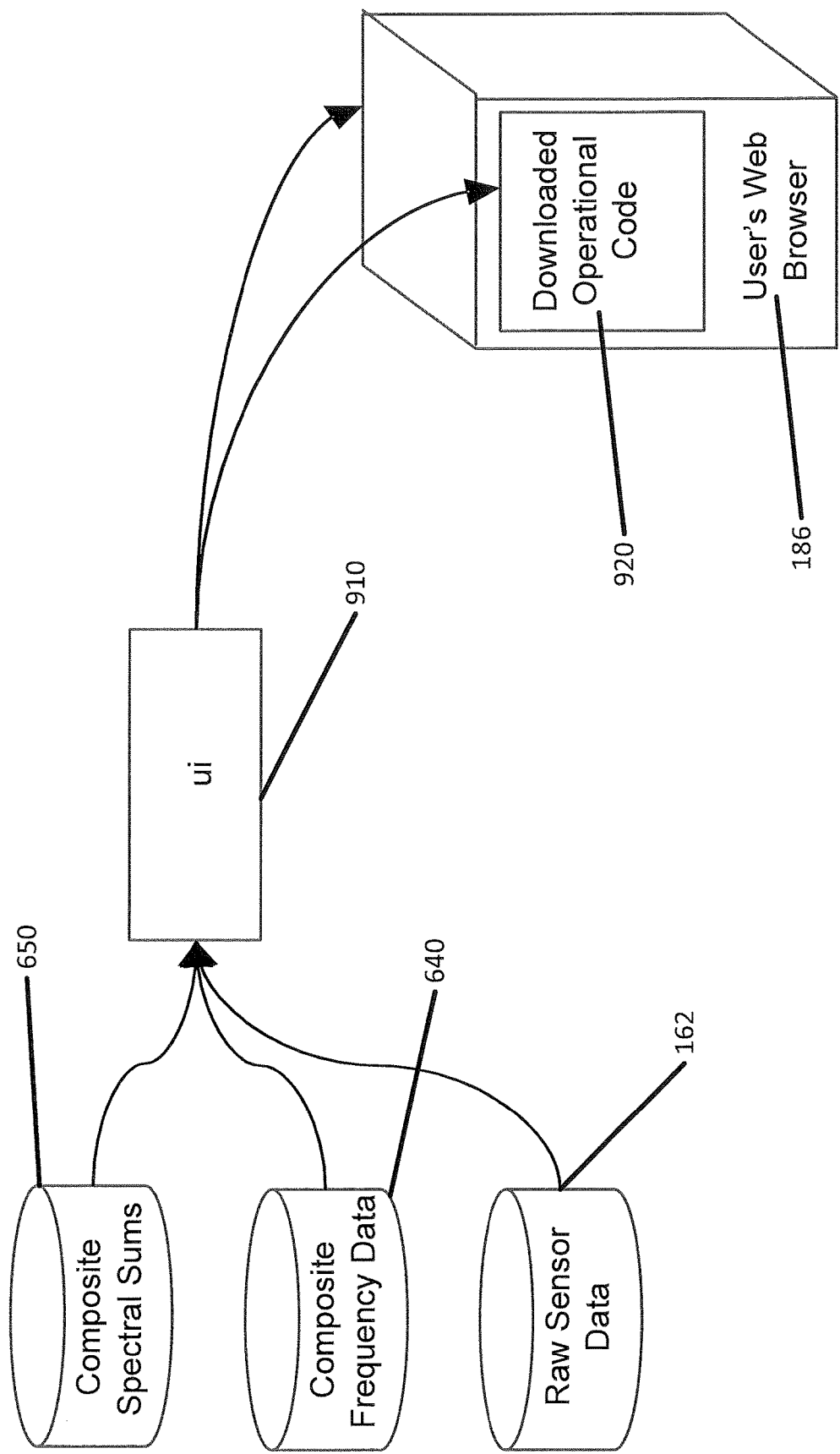
FIG. 9 illustrates a detailed view of the user interface stage of FIG. 3 according to embodiments of the present inventive concepts.

FIG. 9 illustrates a detailed view of the user interface stage 346 of FIG. 3 according to embodiments of the present inventive concepts. As illustrated in FIG. 9, a user interface (UI) computer process 910 may operate within the web services 150. For example, the UI computer process 910 may operate in conjunction with a web server to serve data associated with the web services 150.

The UI computer process 910 may allow a user to access data associated with the monitoring system 100 via a web browser 186 of the user. For example, the UI computer process 910 may be able to display data such as, for example, the composite spectral sums 650, the composite frequency data 640, and/or the raw sensor data 162 (see FIG. 6). It will be understood that these are only example data sets that may be accessed via the UI computer process 910 and that other data sets may be accessed instead of, or in addition to, the composite spectral sums 650, the composite frequency data 640, and/or the raw sensor data 162.

The UI computer process 910 may allow the user to display general trends of the data, specific measured data sets, and/or projections of future data based on the analytics performed by the monitoring system 100. The UI computer process 910 may illustrate the data as numeric data, graphical data, or combinations of the two.

In some embodiments, the monitoring system 100 may include a portion of operational code 920 which may be downloaded to the web browser 186 of the user. The downloadable operational code 920 may execute within the web browser 186 of the user and may allow for additional interactions with the UI computer process 910. For example, the downloadable operational code 920 may allow for the generation of dynamic queries to the data stored with the monitoring system 100. The downloadable operational code 920 may also interact with other portions of the web services 150 to manipulate and/or generate additional data related to the monitoring system 100. For example, the user may operate the downloadable operational code 920 to generate a query specific to a particular piece of machinery being monitored. The user may further operate the downloadable operational code 920 to customize the data being presented for the particular piece of machinery being monitored to focus on, for example, a particular measurement and/or a particular date range being monitored. It will be understood that there are multiple types of operations that could be performed by the downloadable operational code 920 relating to the data of the monitoring system 100 that are possible without deviating from the present inventive concepts.

Figure 10:
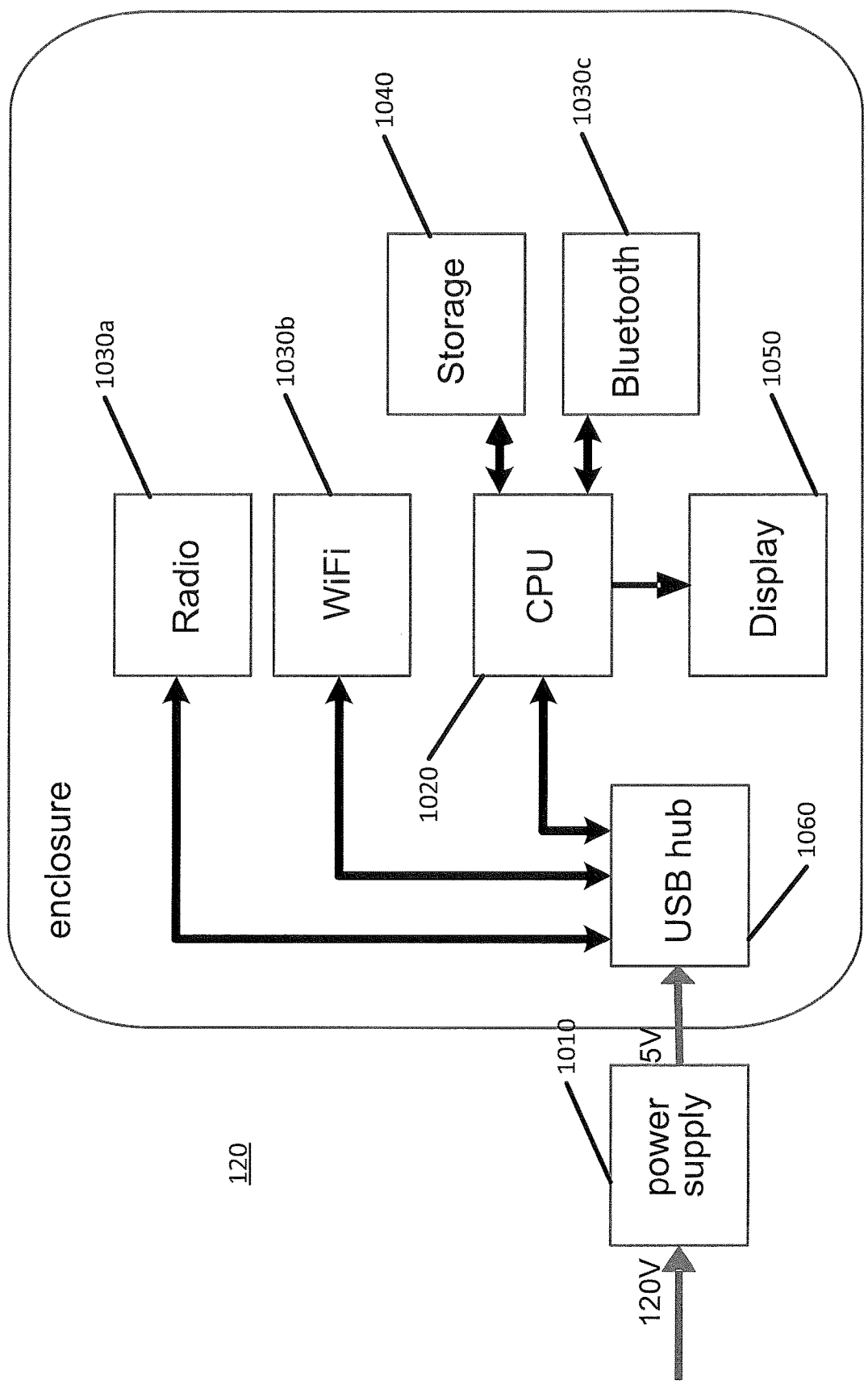
FIG. 10 illustrates an example embodiment of a gateway according to embodiments of the present inventive concepts.

FIG. 10 illustrates an example embodiment of a gateway 120 according to embodiments of the present inventive concepts.

As illustrated in FIG. 10, the gateway 120 may receive power from a power supply 1010. Though illustrated as a wired power supply 1010, the present inventive concepts are not limited thereto. For example, the gateway 120 may receive power from a battery, other AC and/or DC voltages, etc. Also, though illustrated as external to the enclosure, the power supply 1010 in FIG. 10, in some embodiments, the power supply 1010 may be included within the enclosure.

The gateway 120 may include one or more processors 1020. The processor(s) 1020 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 1020 may be configured to execute computer program instructions from a memory to perform some or all of the operations and methods for one or more of the embodiments disclosed herein.

The processor(s) 1020 may be in communication with one or more communication adapters. For example, the processor(s) 1020 may be coupled to a radio communication adapter 1030*a*, a wireless networking adapter 1030*b*, and/or a wireless Bluetooth adapter 1030*c*. The communication adapters 1030*a-c* may include a communication interface and may be used to transfer information in the form of signals between the gateway 120 and another computer system or a network (e.g., the Internet). The communication adapters 1030*a-c* are examples only, and the gateway 120 may include other types of communication adapter such as a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The processor(s) 1020 may be coupled to the communication adapters 1030*a-c* through various means. For example, the processor(s) 1020 may be coupled to the communication adapters 1030*a-c* via a universal serial bus (USB) interface, such as a USB hub 1060. In some embodiments, the processor(s) 1020 may be coupled to the communication adapters 1030*a-c* through other interfaces. The interfaces may be any one or more separate physical buses, point to point connections, or both connected by appropriate bridges, adapters, or controllers. The interfaces, therefore, may include, for example, a system bus, a Peripheral Component Interconnect (PCI) bus or PCI-Express bus, a Hyper-Transport or industry standard architecture (ISA) bus, a small computer system interface (SCSI) bus, a USB bus, IIC (I2C) bus, or an Institute of Electrical and Electronics Engineers (IEEE) standard 1394 bus, also called "Firewire."

The gateway 120 may further include storage 1040 which may contain program code configured to execute operations associated with the methods described herein. The storage 1040 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage 1040 may also include configuration data used to operate the gateway 120, and/or data received from sensors 110.

The gateway 120 may also include a display 1050. The display 1050 may allow for graphics and/or text to be displayed on the gateway 120. The processor(s) 1020 may be coupled to the display 1050 and may control the display 1050 so as to present an operational status of the gateway 120 and/or provide controls to operate the gateway 120. For example, in some embodiments, the display 1050 may include a touch-sensitive interface allowing for input to be provided to the gateway 120.

Figure 11:
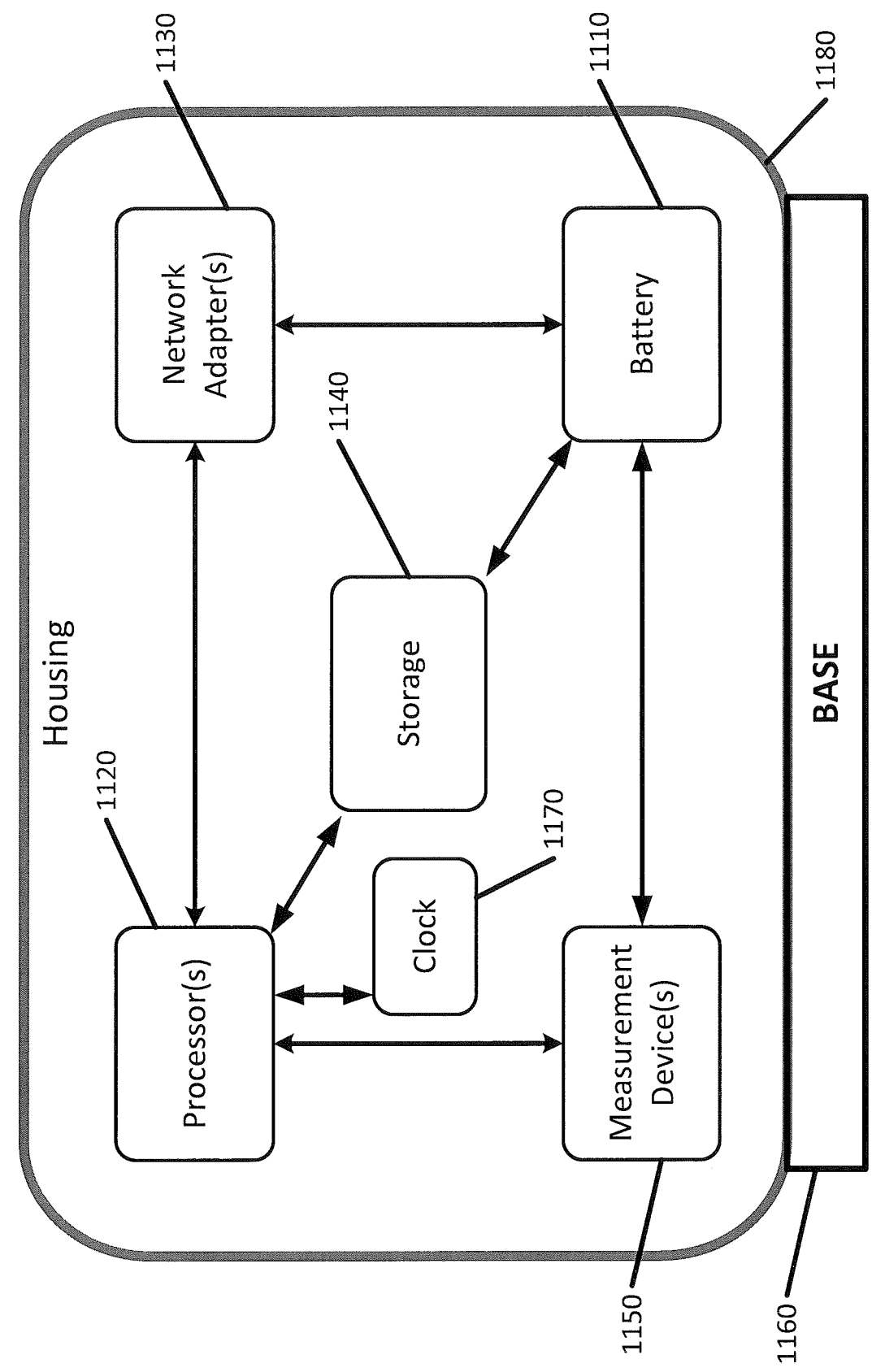
FIG. 11 illustrates an example embodiment of a sensor according to embodiments of the present inventive concepts.

FIG. 11 illustrates an example embodiment of a sensor 110 according to embodiments of the present inventive concepts.

As illustrated in FIG. 11, the sensor 110 may receive power from a battery 1110. Though illustrated as a battery 1110, the present inventive concepts are not limited thereto. For example, the sensor 110 may receive power from a wired connection provided other AC and/or DC voltages, etc. In some embodiments, the sensor 110 may obtain power from its environment (e.g., solar, vibration, temperature gradient, etc.).

The sensor 110 may include one or more processors 1120. The processor(s) 1120 may be, or may include, one or more programmable general purpose or special-purpose microprocessors, DSPs, programmable controllers, ASICs, PLDs, FPGAs, TPMs, or a combination of such or similar devices, which may be collocated or distributed across one or more data networks. The processor(s) 1120 may be configured to execute computer program instructions from a memory to perform some or all of the operations and methods for one or more of the embodiments disclosed herein. In some embodiments, the processor(s) 1120 may contain and/or be coupled to a high-resolution clock. In some embodiments, the clock may be configured to provide clock signals to enable the processor(s) 1120 to perform time synchronization of the scheduling of samples from measurement device(s) 1150.

In some embodiments, the processor(s) 1120 may be in communication with clock 1170. Though illustrated as a separate entity in FIG. 11, the clock 1170 may be incorporated into the processor(s) 1120 in some embodiments. The processor(s) 1120 may utilize the clock 1170 for scheduling measurements, as described herein.

The processor(s) 1120 may be in communication with one or more network adapters 1130. The network adapters 1130 may include a communication interface and may be used to transfer information in the form of signals between the sensor 110 and another computer system, a gateway 120, a repeater 115 and/or a network (e.g., the Internet). The network adapters 1130 may include various types of network adapters such as a modem, a network interface (such as an Ethernet card), a wireless interface, a radio interface, a communications port, a PCMCIA slot and card, or the like. The network adapters 1130 may communicate via, for example, WiFi (e.g., IEEE 802.11 and variants thereof), USB, IEEE 1394, Bluetooth, Bluetooth Low-Energy, a power line network (PLN), electrical wiring, and/or various forms of radio, though the present inventive concepts are not limited thereto. The network adapters 1130 may be conventional components, such as those used in many conventional computing devices, and their functionality, with respect to conventional operations, is generally known to those skilled in the art.

The sensor 110 may include one or more measurement devices 1150. The measurement device(s) 1150 may include, for example, accelerometers, temperature sensors, motion sensors, global positioning system (GPS) sensors, pressure sensors, moisture sensors, etc. The processor(s) 1120 may be configured to access the measurement device(s) 1150 to retrieve data measured by the measurement device(s) 1150. The processor 1120 may be further configured to transfer the measurement data received from the measurement device(s) 1150 to the gateway 120 and/or the repeater 115 via the network adapters 1130 on the sensor 110. The processor(s) 1120 may also be able to access the measurement device(s) 1150 at a configured sampling rate, configure the measurement device(s) 1150 to sample at a particular configured sampling rate, and/or deliver sampled measurement data over the network adapters 1130 at a scheduled interval. The scheduled interval for delivering the sampled measurement may be independent of the configured sampling rate.

In some embodiments, the processor(s) 1120 may be configured to switch the sensor 110 between different modes of operation. For example, the processor(s) 1120 may be capable of switching the sensor 110 between a "normal" mode and a "low power" mode, as discussed herein. In some embodiments, the processor(s) 1120 may be configured to change a sampling rate (or other configuration) of the measurement device 1150. For example, the processor(s) 1120 may be able to increase or decrease a sampling rate of the measurement device 1150 dynamically.

The sensor 110 may further include storage 1140 which may contain program code configured to execute operations associated with the methods described herein. The storage 1140 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage 1140 may also include configuration data used to operate the sensor 110. In some embodiments, the storage 1140 may be used to store measurement data waiting to be transmitted to a gateway 120 and/or the repeater 115.

The processor(s) 1120 may be coupled to the network adapters 1130, the storage 1140, and/or the measurement device(s) 1150 through various means. For example, the processor(s) 1120 may be coupled to the network adapters 1130, storage 1140, and/or the measurement device(s) 1150 through interfaces comprising any one or more separate physical buses, point to point connections, or both connected by appropriate bridges, adapters, or controllers. The interfaces, therefore, may include, for example, a system bus, a PCI bus or PCI-Express bus, a HyperTransport or ISA bus, a SCSI bus, a USB bus, an I2C bus, and/or an IEEE standard 1394 bus, also called "Firewire."

The sensor 110 may also include a base 1160. The base 1160 may be configured to be releasably or fixedly coupled to machinery being monitored. For example, the base 1160 may be magnetic, but the present inventive concepts are not limited thereto. For example, in some embodiments, the base 1160 may include a fastening apparatus configured to mechanically fasten the sensor 110 to the machinery being monitored. The base 1160 may be part of, or connected with, a common housing 1180. The processor(s) 1120, the network adapters 1130, the storage 1140, the battery 1110 and/or the measurement device(s) 1150 may be contained within the common housing 1180.

As described herein, embodiments of the present inventive concepts may provide a monitoring system 100 with sensors capable of communicating with web services 150 over a mesh network 200. The data collected by the sensors 110 may be stored in the cloud and accessed remotely by a user of the monitoring system 100. The monitoring system 100 may further provide analytics which analyze the data collected from the sensors 110 to provide alerts, configurations, recommendations, and/or status of the machinery being monitored. In some embodiments, the analytics may determine if a condition is present in the machinery being monitored and provide, responsively, alerts to the user of the monitoring system.

Embodiments of the present inventive concepts were described herein with reference to the accompanying drawings. Other embodiments may take many different forms and should not be construed as limited to the embodiments set forth herein. Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

It will be understood that though the description provided herein and accompanying figures may use particular names to indicate computer processes, these are arbitrary names for the computer process performing the described functions. Other names, indications, or designations are possible for these computer processes, including the use of multiple computer processes, without deviating from the present inventive concepts The terminology used herein is for the purpose of describing particular embodiments only and is not intended to be limiting to other embodiments. As used herein, the singular forms "a," "an," and "the" are intended to include the plural forms as well, unless the context clearly indicates otherwise. It will be further understood that the terms "comprises," "comprising," "includes," and/or "including," "have," and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present inventive concepts may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication networks to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the present inventive concepts being set forth in the following claims.

What is claimed is:

1. A sensor comprising:
a housing configured to couple to a machine;
at least one processor within the housing;
a battery within the housing;
a communication adapter within the housing and coupled to the at least one processor, wherein the communication adapter is configured to wirelessly connect to a communication network; and
a measurement device within the housing and coupled to the at least one processor and the battery,
wherein the measurement device is configured to:
obtain measurements of a physical characteristic of the machine to which the housing is coupled and transmit the measurements via the communication adapter, and
automatically switch between a first measurement mode comprising a first sampling rate and a second measurement mode comprising a second sampling rate, different from the first sampling rate, without human intervention,
wherein the measurement device is further configured to switch between the first measurement mode and the second measurement mode responsive to a detected change in the physical characteristic of the machine.

2. The sensor of claim 1, further comprising:
a storage device within the housing and coupled to the at least one processor and configured to store the measurements of the physical characteristic that are obtained by the measurement device,
wherein the first measurement mode utilizes less storage from the storage device than the second measurement mode.

3. The sensor of claim 1, wherein the first measurement mode consumes less power from the battery than the second measurement mode.

4. The sensor of claim 1, wherein the measurement device is further configured to:
switch from the first measurement mode to the second measurement mode responsive to an elapse of a predetermined time duration, and
switch from the first measurement mode to the second measurement mode prior to the elapse of the predetermined time duration responsive to the detected change in the physical characteristic exceeding a predetermined threshold.

5. The sensor of claim 1, further comprising:
a first set of computer instructions comprising a first firmware level at a first storage location within the housing; and
a second set of computer instructions comprising a second firmware level, different from the first set of computer instructions, at a second storage location, different from the first storage location, within the housing,
wherein the at least one processor is configured to transmit a network communication via the communication adapter and to switch from the first set of computer instructions to the second set of computer instructions responsive to an absence of a response to the network communication within a predetermined time interval.

6. The sensor of claim 1, wherein the physical characteristic of the machine is vibration and/or temperature.

7. A sensor comprising:
a housing configured to couple to a machine;
at least one processor within the housing;
a battery within the housing;
a communication adapter within the housing and coupled to the at least one processor, wherein the communication adapter is configured to wirelessly connect to a communication network; and
a measurement device within the housing and coupled to the at least one processor and the battery,
wherein the measurement device is configured to:
obtain measurements of a physical characteristic of the machine to which the housing is coupled and transmit the measurements via the communication adapter, and
automatically switch between a first measurement mode comprising a first sampling rate and a second measurement mode comprising a second sampling rate, different from the first sampling rate, without human intervention,
wherein the measurement device is further configured to switch between the first measurement mode and the second measurement mode responsive to a communication received by the communication adapter.

8. The sensor of claim 7, further comprising:
a storage device within the housing and coupled to the at least one processor and configured to store the measurements of the physical characteristic that are obtained by the measurement device,
wherein the first measurement mode utilizes less storage from the storage device than the second measurement mode.

9. The sensor of claim 7, wherein the first measurement mode consumes less power from the battery than the second measurement mode.

10. The sensor of claim 7, further comprising:
a first set of computer instructions comprising a first firmware level at a first storage location within the housing; and
a second set of computer instructions comprising a second firmware level, different from the first set of computer instructions, at a second storage location, different from the first storage location, within the housing,
wherein the at least one processor is configured to transmit a network communication via the communication adapter and to switch from the first set of computer instructions to the second set of computer instructions responsive to an absence of a response to the network communication within a predetermined time interval.

11. The sensor of claim 7, wherein the physical characteristic of the machine is vibration and/or temperature.

12. A networking gateway comprising:
at least one processor; and
a communication adapter coupled to the at least one processor and configured to wirelessly connect to a communication network, wherein the at least one processor is configured to perform operations comprising:
transmitting configuration information to a remote measurement device wirelessly via the communication adapter, the configuration information configured to switch the remote measurement device between a first measurement mode comprising a first sampling rate of the remote measurement device and a second measurement mode comprising a second sampling rate of the remote measurement device, different from the first sampling rate, and
receiving measurement data of a physical characteristic of a machine from the remote measurement device wirelessly via the communication adapter, and
wherein receiving the measurement data from the remote measurement device wirelessly via the communication adapter comprises receiving the measurement data at a time interval that is independent of a rate at which the remote measurement device samples the measurement data.

13. The networking gateway of claim 12, wherein the operations further comprise:
analyzing the measurement data received from the remote measurement device;
detecting a change in the measurement data that exceeds a predetermined threshold; and
transmitting the configuration information to switch the remote measurement device between the first measurement mode and the second measurement mode responsive to the detected change in the measurement data.

14. The networking gateway of claim 12, wherein the operations further comprise:
receiving a clock communication from the remote measurement device comprising a clock time of the remote measurement device; and
calculating a clock offset of the clock time of the remote measurement device from a common reference clock.

15. The networking gateway of claim 14, wherein the measurement data comprises a timestamp, and wherein the operations further comprise:
adjusting the timestamp of the measurement data based on the clock offset.

16. The networking gateway of claim 15, wherein the remote measurement device is a first remote measurement device, the measurement data is first measurement data, the clock communication is a first clock communication, the clock time is a first clock time, the timestamp is a first timestamp, and the clock offset is a first clock offset, and
wherein the operations further comprise:
receiving a second clock communication from a second remote measurement device comprising a second clock time of the second remote measurement device,
wherein the second remote measurement device is different from the first remote measurement device;
calculating a second clock offset of the second clock time of the second remote measurement device from the common reference clock,
wherein the second clock offset is different from the first clock offset;
receiving second measurement data from the second remote measurement device wirelessly via the communication adapter; and
adjusting a second timestamp of the second measurement data based on the second clock offset.

17. The networking gateway of claim 14, wherein the configuration information comprises a sampling schedule configured to schedule a measurement of the remote measurement device at a designated time,
wherein the sampling schedule is based on the clock offset.

18. The networking gateway of claim 17, wherein the remote measurement device is a first remote measurement device, the configuration information is first configuration information, the measurement data is first measurement data, the clock communication is a first clock communication, the clock time is a first clock time, the clock offset is a first clock offset, and the sampling schedule is a first sampling schedule, and
wherein the operations further comprise:
receiving a second clock communication from a second remote measurement device comprising a second clock time of the second remote measurement device,
wherein the second remote measurement device is different from the first remote measurement device;
calculating a second clock offset of the second clock time of the second remote measurement device from the common reference clock,
wherein the second clock offset is different from the first clock offset; and
transmitting second configuration information to the second remote measurement device wirelessly via the communication adapter, the second configuration information comprising a second sampling schedule, different from the first sampling schedule, that is configured to schedule a measurement of the second remote measurement device at the designated time.

19. The networking gateway of claim 18, wherein the operations further comprise scheduling the measurement of the first remote measuring device and the second remote measurement device at the designated time responsive to determining that the first remote measurement device and the second remote measurement device are located on a same machine.

* * * * *